(12) United States Patent
Kutscha et al.

(10) Patent No.: US 11,885,725 B2
(45) Date of Patent: Jan. 30, 2024

(54) SURFACE ANALYSIS TOOLS FOR PROCESS CONTROL OF LASER TREATMENT OF COMPOSITES

(71) Applicant: The Boeing Company, Chicago, IL (US)

(72) Inventors: Eileen O. Kutscha, Seattle, WA (US); Kay Youngdahl Blohowiak, Issaquah, WA (US)

(73) Assignee: THE BOEING COMPANY, Arlington, VA (US)

( * ) Notice: Subject to any disclaimer, the term of this patent is extended or adjusted under 35 U.S.C. 154(b) by 816 days.

(21) Appl. No.: 16/940,591

(22) Filed: Jul. 28, 2020

(65) Prior Publication Data
US 2021/0096051 A1 Apr. 1, 2021

Related U.S. Application Data

(60) Provisional application No. 62/907,797, filed on Sep. 30, 2019.

(51) Int. Cl.
| | |
|---|---|
| *G01N 13/00* | (2006.01) |
| *G01N 13/02* | (2006.01) |
| *G01B 11/24* | (2006.01) |
| *G01N 21/25* | (2006.01) |
| *G01N 21/3563* | (2014.01) |

(Continued)

(52) U.S. Cl.
CPC ......... *G01N 13/02* (2013.01); *G01B 11/2441* (2013.01); *G01N 21/251* (2013.01); *G01N 21/3563* (2013.01); *G01N 21/57* (2013.01); *G01N 23/22* (2013.01); *G01N 27/041* (2013.01);

(Continued)

(58) Field of Classification Search
CPC .. G01N 13/02; G01N 21/251; G01N 21/3563; G01N 21/57; G01N 23/22; G01N 27/041; G01N 2223/07; G01N 2223/507; G01B 11/2441
See application file for complete search history.

(56) References Cited

U.S. PATENT DOCUMENTS

| | | | |
|---|---|---|---|
| 5,393,980 A | 2/1995 | Yost et al. | |
| 2003/0118927 A1* | 6/2003 | Nakamura | G03G 5/142 430/65 |

(Continued)

FOREIGN PATENT DOCUMENTS

JP H05156522 A * 6/1993

OTHER PUBLICATIONS

Li, S. et al., "A study of laser surface treatment in bonded repair of composite aircraft structures", Royal Society Open Science, Mar. 2018, pp. 1-10, vol. 5, No. 3.

(Continued)

*Primary Examiner* — Max H Noori
(74) *Attorney, Agent, or Firm* — COATS & BENNETT, PLLC

(57) ABSTRACT

Aspects of the present disclosure are directed methods and systems pertaining to the use of at least one methodology or technique for the purpose of at least one of either: 1) determining that a desired and predetermined level or "degree" of surface treatment of a composite substrate surface has or has not been conducted (e.g., laser treatment of a composite substrate surface); and 2) that a composite substrate surface has been laser treated.

20 Claims, 43 Drawing Sheets
(37 of 43 Drawing Sheet(s) Filed in Color)

(51) Int. Cl.
  *G01N 21/57* (2006.01)
  *G01N 23/22* (2018.01)
  *G01N 27/04* (2006.01)

(52) U.S. Cl.
  CPC ... *G01N 2223/07* (2013.01); *G01N 2223/507* (2013.01)

(56) References Cited

U.S. PATENT DOCUMENTS

| | | | | |
|---|---|---|---|---|
| 2007/0298006 | A1* | 12/2007 | Tomalia | A61K 9/0019 525/509 |
| 2014/0099472 | A1* | 4/2014 | Greenhill | F42D 5/045 427/532 |
| 2015/0119238 | A1* | 4/2015 | Pretsch | B29C 59/18 264/293 |
| 2020/0254583 | A1* | 8/2020 | Kutscha | G01N 21/3563 |
| 2020/0303236 | A1* | 9/2020 | Li | A61N 1/05 |
| 2021/0055244 | A1* | 2/2021 | Kutscha | G01N 27/041 |

OTHER PUBLICATIONS

Katnam, K. et al., "Bonded repair of composite aircraft structures: A review of scientific challenges and opportunities". Progress in Aerospace Sciences, Apr. 23, 2013, pp. 26-42, vol. 61.

Li, Y. et al., "Comparative study of infrared laser surface treatment and ultraviolet laser surface treatment of CFRP laminates", The International Journal of Advanced Manufacturing Technology, Mar. 6, 2019, pp. 4059-4071, vol. 102, No. 9.

Kutscha,.E. et al., "Optically Enhanced Bonding Workstation for Robust Bonding", SAMPE, Apr. 11, 2019, pp. 1-15, Charlotte, NC.

Jaeschke, J. et al., "How laser technology can contribute to foster a widespread use of advanced composite materials for light weight applications", Proceedings of SPIE, Feb. 27, 2019, pp. 1-8, vol. 10911.

Kanerva, M. et al.,"The peel ply surface treatment for adhesive bonding of composites: A review", International Journal of Adhesion & Adhesives, Feb. 1, 2013, pp. 60-69, vol. 43.

Palmieri, F. et al., "Picosecond Pulsed Laser Ablation for the Surface Preparation of Epoxy Composites", Aug. 31, 2019, pp. 1-14, retrieved from the Internet: https://core.ac.uk/download/pdf/84913762, retrieved on Feb. 10, 2021.

See, T. et al., "Laser abrading of carbon fibre reinforced composite for improving paint adhesion", Applied Physics A Materials Science & Processing, Jun. 6, 2014, pp. 1045-1054, vol. 117, No. 3.

European Search Report for corresponding EP application dated Feb. 11, 2021.

* cited by examiner

SURFACE ANALYSIS TOOLS FOR PROCESS CONTROL OF LASER TREATMENT OF COMPOSITES

RELATED APPLICATION

The present application claims benefit of U.S. Provisional Application 62/907,797, filed on Sep. 30, 2019, and is incorporated by reference herein in its entirety.

TECHNOLOGICAL FIELD

The present disclosure relates generally to the field of composite material surface inspection. More specifically the present disclosure relates to the field of inspecting laser-treated composite material surfaces to indirectly assess levels of surface treatment.

BACKGROUND

Surface analysis of materials during stages of manufacturing can be important in determining the success of future processing steps to be conducted on a material substrate surface. In the field of composite materials, composite material surfaces have been conditioned or otherwise treated according to laborious and ergonomically disadvantageous manual hand processes including, for example, sanding processes, etc. Such processes are necessary as treating composite material surfaces and other material surfaces can improve the adhesion of various coatings to be applied to the material surfaces.

Automated composite material surfacing procedures have been attempted that can replace or augment the typical procedures that are conducted manually. However, to satisfy regulatory or manufacturing guidelines, or to otherwise make certain that a machined or conditioned substrate surface has been adequately prepared for subsequent processing, substrate surface inspection has typically relied on qualitative inspections that are often performed manually.

SUMMARY

According to presents aspects, a method for inspecting a laser-treated carbon-containing composite material substrate surface is disclosed including conducting at least one surface analysis on a carbon-containing composite material surface, with the at least one surface analysis selected from and including: gloss analysis, Fourier transform infrared spectroscopy, color analysis, contact angle analysis, surface resistivity, optical interferometry, and optically stimulated electron emission, and obtaining actual carbon-containing composite material surface values from the at least one surface analysis performed on the carbon fiber epoxy-based composite material surface.

In another aspect, the method further includes accessing an ideal carbon-containing composite material surface value and comparing the actual carbon-containing composite material surface values to the ideal carbon fiber epoxy-based composite material surface value.

In a further aspect, the method further includes determining a laser treatment level of the carbon-containing composite material surface.

In another aspect, the method further includes quantifying an amount of material removal from the carbon-containing composite material surface.

In a further aspect the method further includes predicting an adhesion level of a coating layer to the carbon-containing composite material surface.

In a further aspect, the method further includes predicting an adhesion level of the carbon-containing composite material surface.

In another aspect, the carbon-containing composite material surface includes a carbon fiber epoxy-based composite material.

According to further present aspects, a method for inspecting a carbon fiber epoxy-based composite material surface is disclosed, with the method including orienting a laser proximate to a carbon fiber epoxy-based composite material surface, activating the laser to produce a laser beam, and directing the laser beam from the laser to the carbon fiber epoxy-based composite material surface. The method further includes ablating an amount of material from the carbon fiber epoxy-based composite material surface to form a carbon fiber epoxy-based composite material surface comprising a level of laser treatment, quantifying the level of ablative surface treatment of the carbon fiber epoxy-based composite material surface by conducting at least one surface analysis on a carbon fiber epoxy-based composite material surface, with the surface analysis selected from: gross analysis, Fourier transform infrared spectroscopy, color analysis, contact angle analysis, surface resistivity, optical interferometry, and optically stimulated electron emission. The method further includes obtaining actual carbon fiber epoxy-based composite material surface values resulting from the surface analysis performed on the carbon fiber epoxy-based composite material surface.

In another aspect, the method includes accessing an ideal carbon fiber epoxy-based composite material surface value and comparing the actual carbon fiber epoxy-based composite material surface values to the ideal carbon fiber epoxy-based composite material surface value.

In another aspect, the method further includes determining a laser-treatment level of the carbon fiber epoxy-based composite material surface.

In another aspect, the method further includes quantifying an amount of material removal from the laser-treated carbon fiber epoxy-based composite material surface.

In another aspect, the method further includes predicting an adhesion characteristic of the laser-treated carbon fiber epoxy-based composite material surface.

According to present aspects, a system is disclosed for determining a level of laser treatment of a carbon-containing composite material substrate surface, with the system including at least one surface analyzer, with the surface analyzer configured to perform at least one surface analysis selected from the group including: gloss analysis, Fourier transform infrared spectroscopy analysis, color analysis, contact angle analysis, surface resistivity analysis, optical interferometry analysis, and optically stimulated electron emission analysis. The surface analyzer is configured to generate a signal corresponding to at least one surface analysis of the carbon fiber epoxy-based composite material surface, said surface analysis selected from the group including: gloss analysis, Fourier transform infrared spectroscopy analysis, color analysis, contact angle analysis, surface resistivity analysis, optical interferometry analysis, and optically stimulated electron emission analysis.

According to another aspect, the system further includes a processor in communication with the surface analyzer, and a memory, with the memory including a memory value corresponding to an ideal laser-treated carbon-containing composite material surface characteristic value, and with the memory configured to be accessed by the processor. The system further includes software in communication with the processor, with software configured to compare the ideal laser-treated carbon-containing composite material surface characteristic value to the signal corresponding to the surface analysis of the carbon-containing composite material surface performed by the surface analyzer.

In a further aspect, the system further includes a laser configured to remove material from the carbon-containing composite material substrate.

In another aspect, the carbon-containing composite material substrate is a carbon fiber epoxy-based composite material substrate.

In another aspect, the carbon-containing composite material substrate includes a carbon fiber epoxy-based composite material substrate surface.

The features, functions, and advantages that have been discussed can be achieved independently in various aspects or may be combined in yet other aspects, further details of which can be seen with reference to the following description and the drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Figure 1:
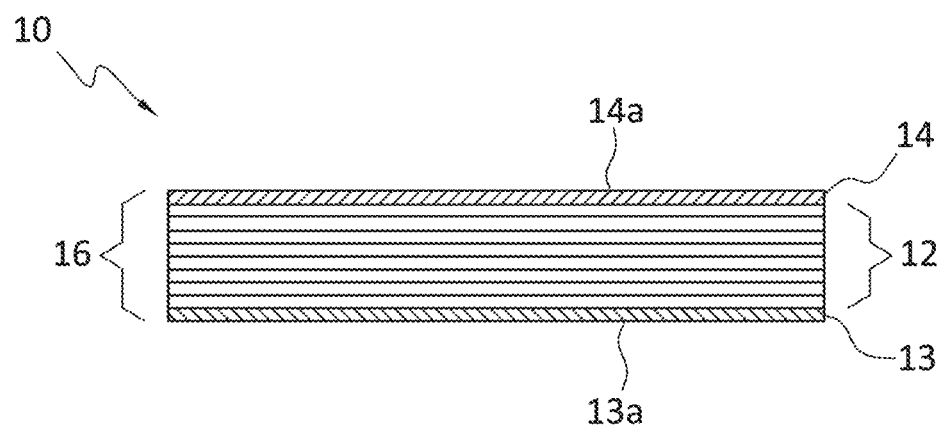
Figure 2:
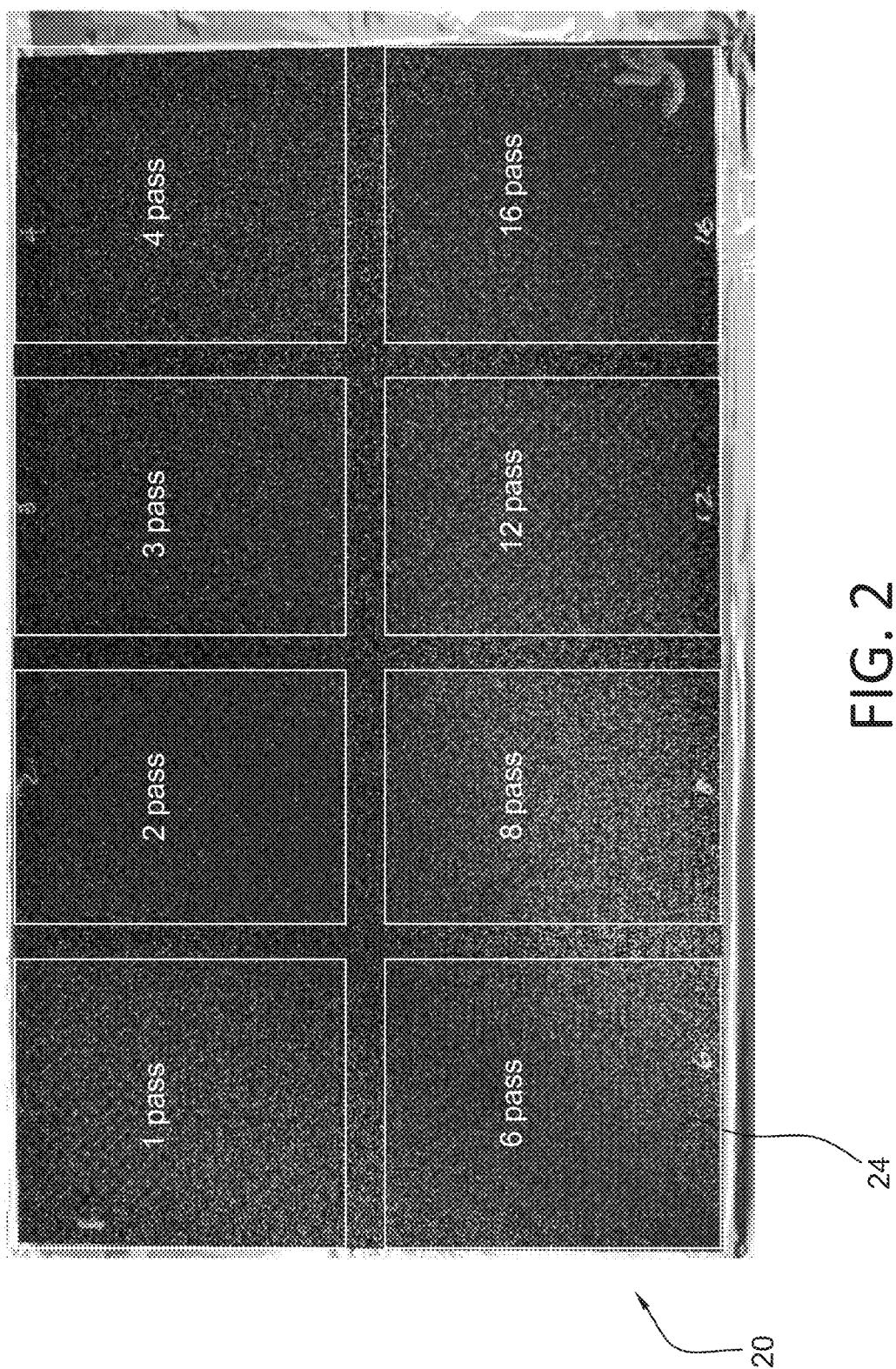
Figure 3:
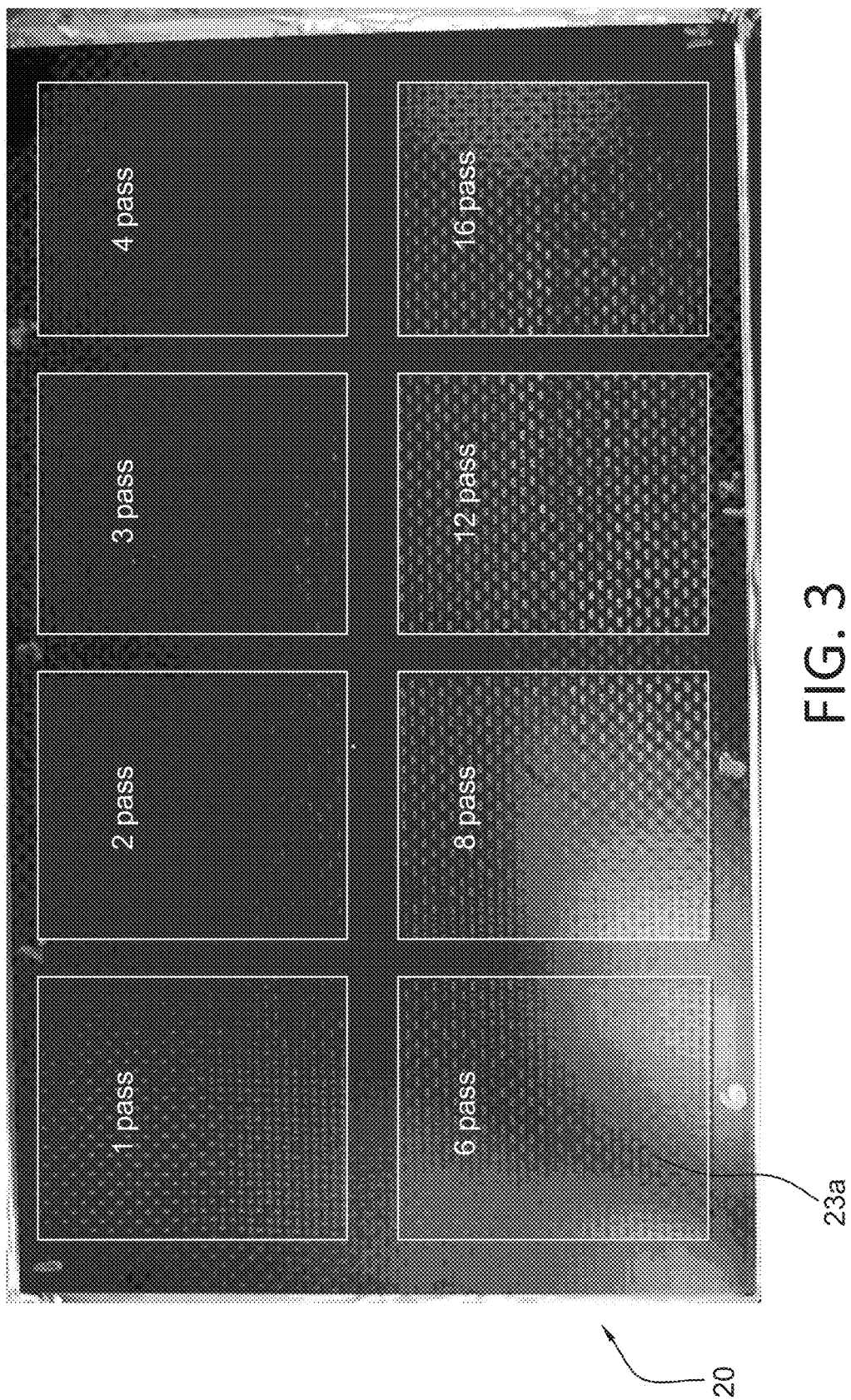
Figures 4A, 4B:
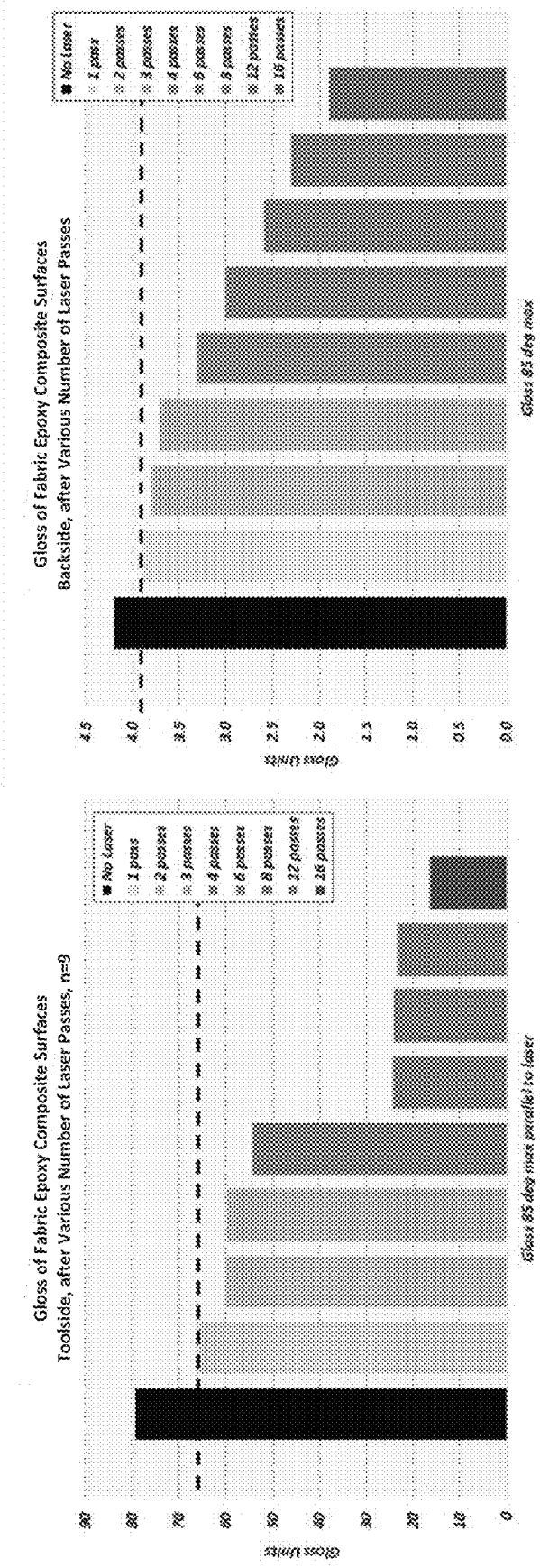
Figure 4C:
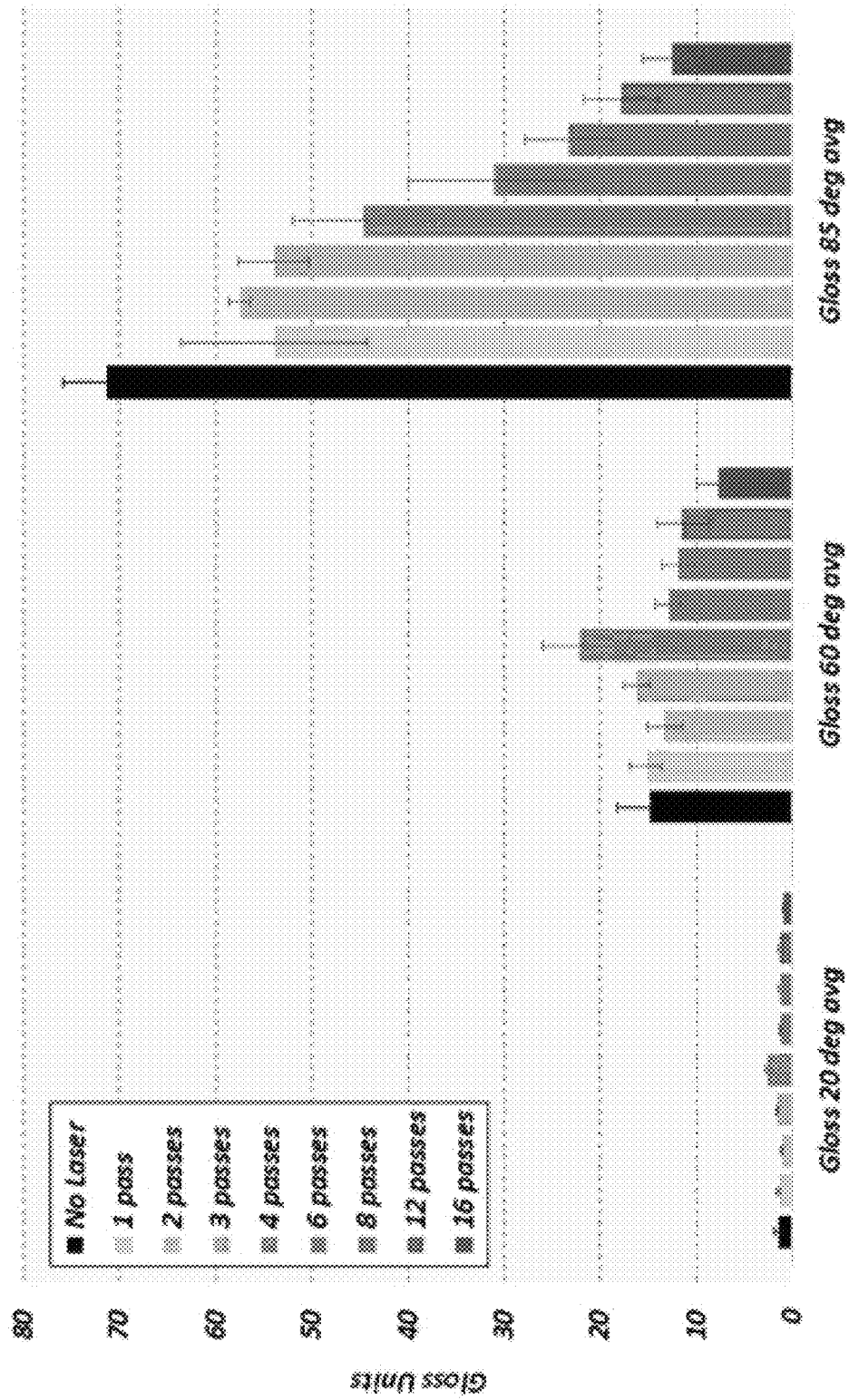
Figure 4D:
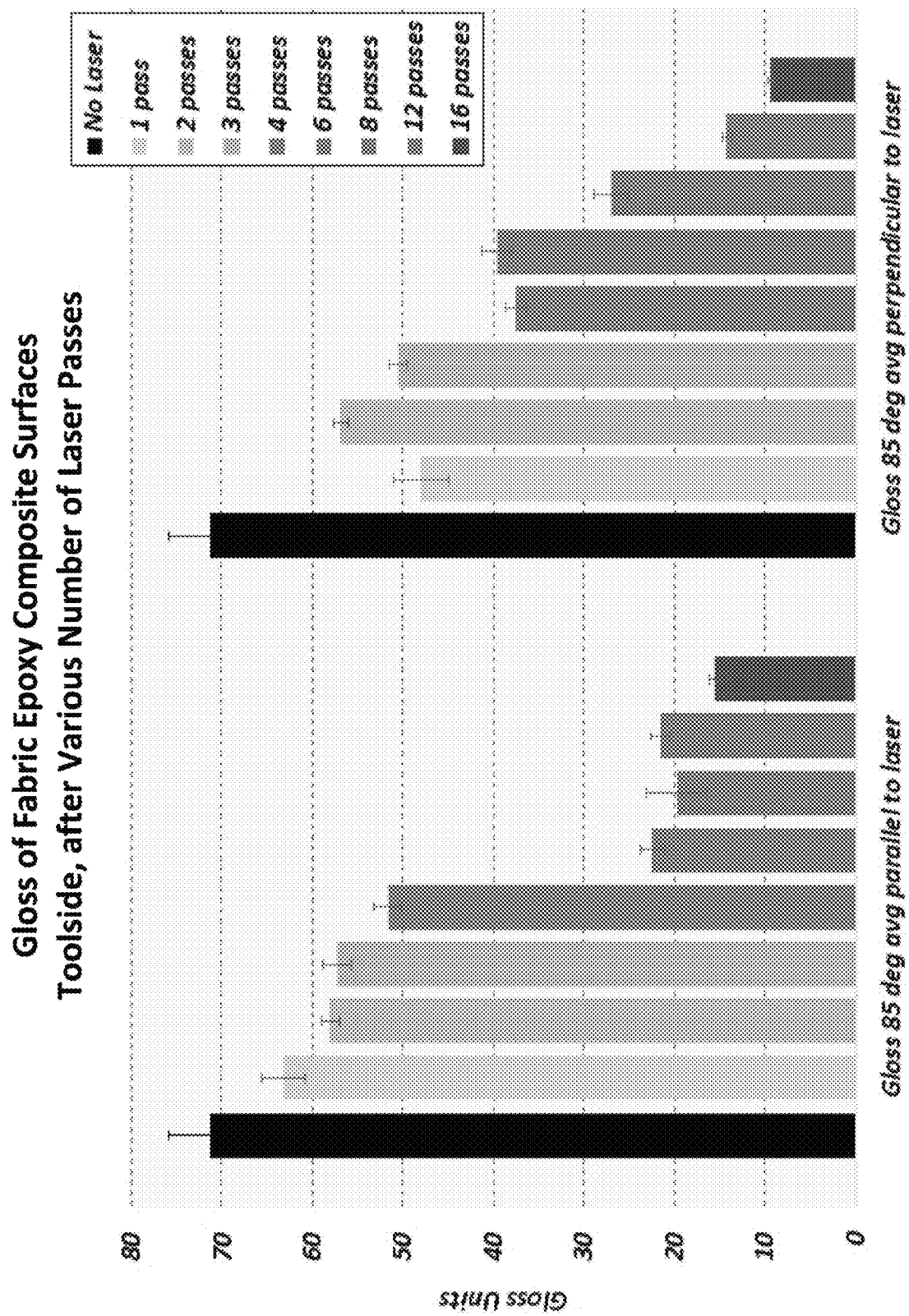
Figure 4E:
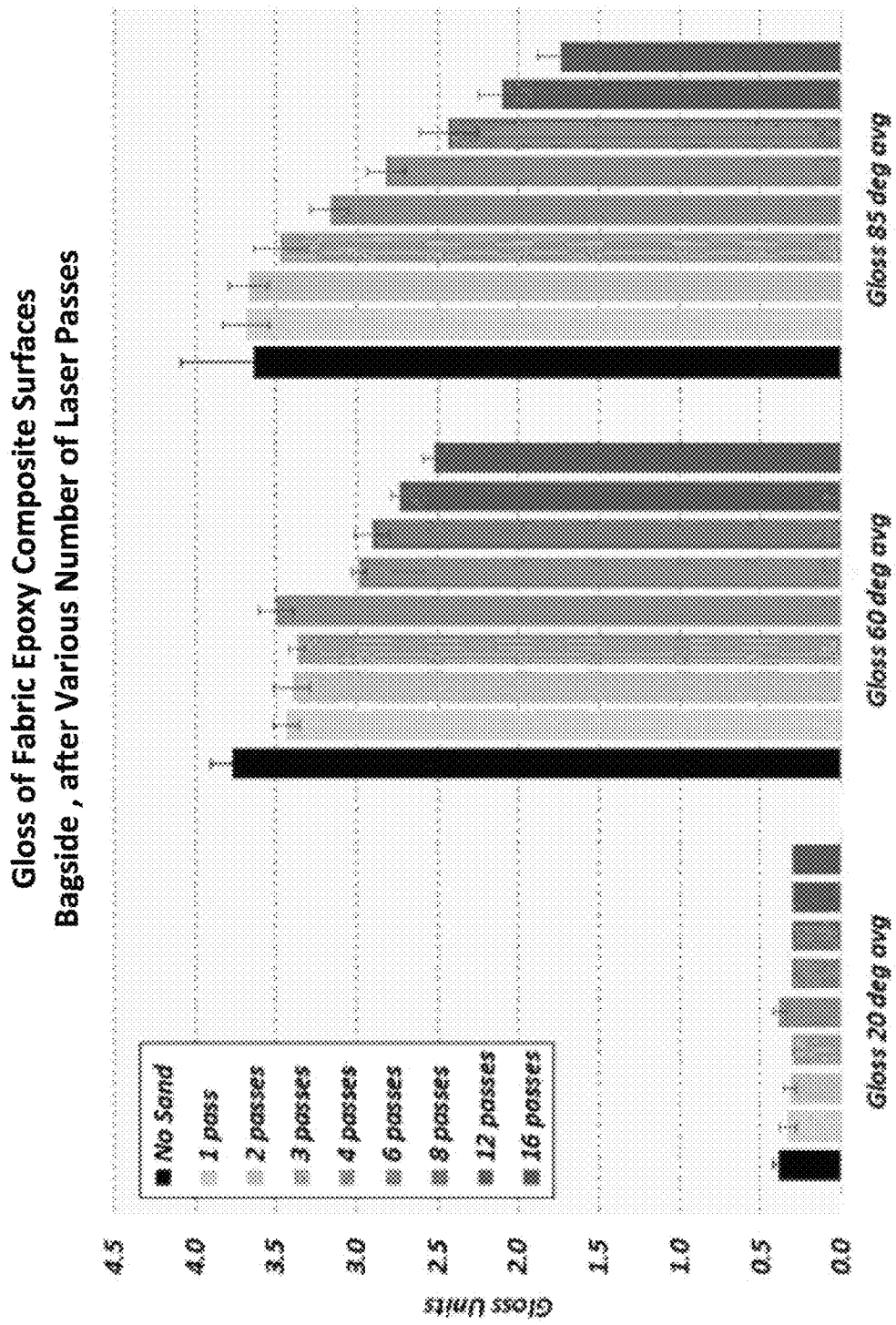
Figure 4F:
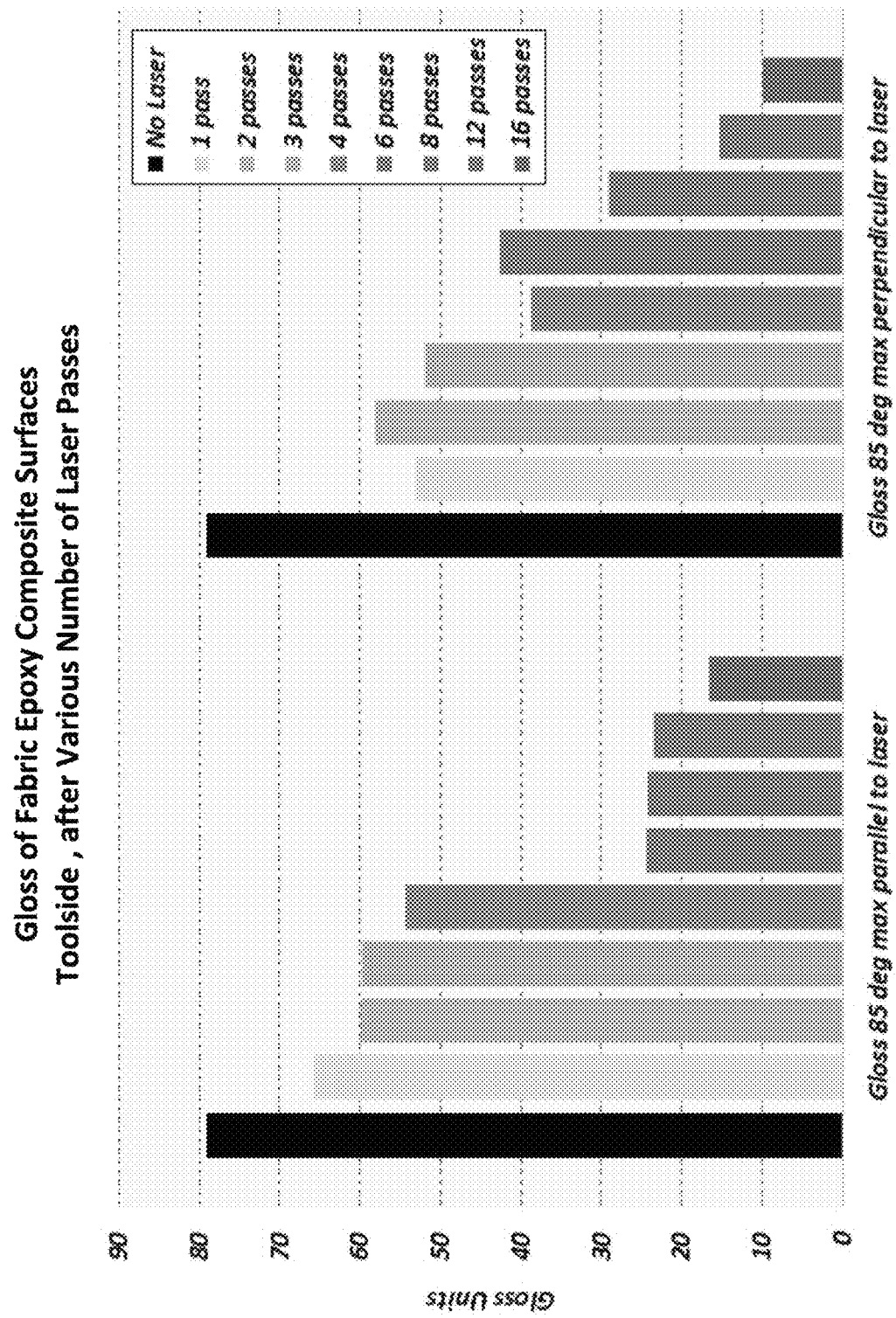
Figures 5A, 5B:
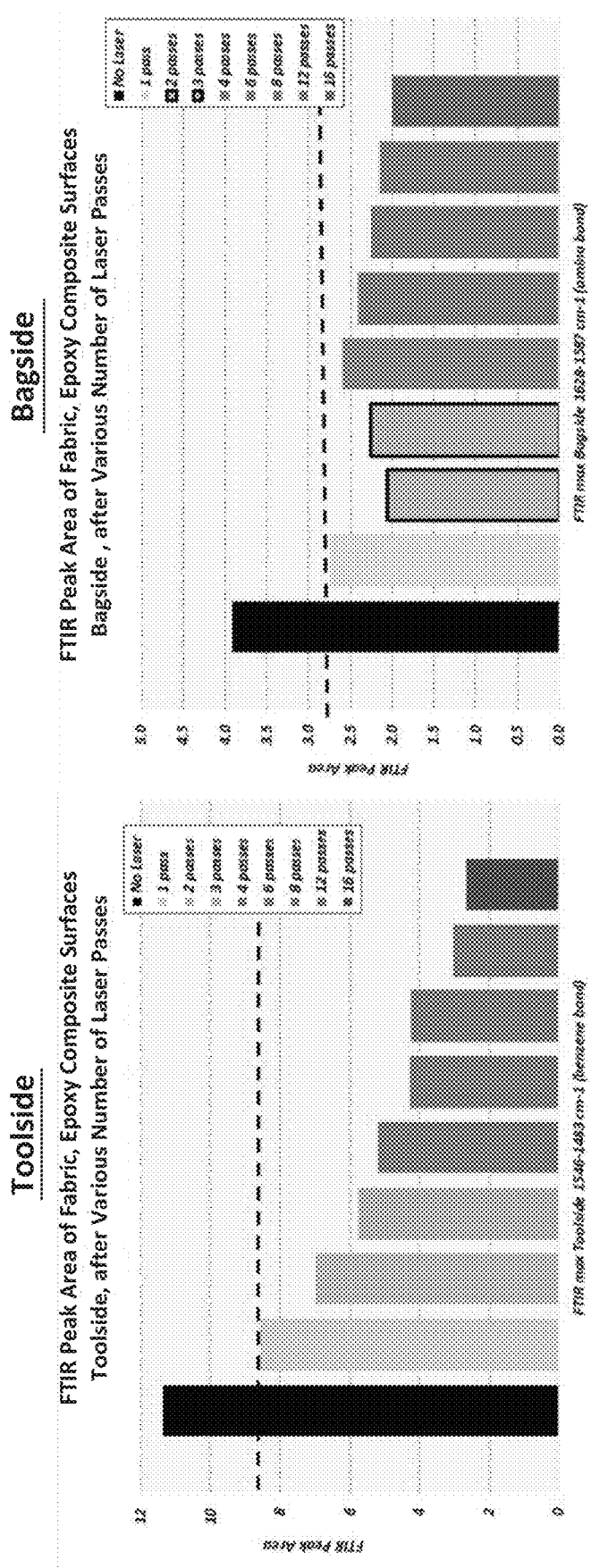
Figure 6A:
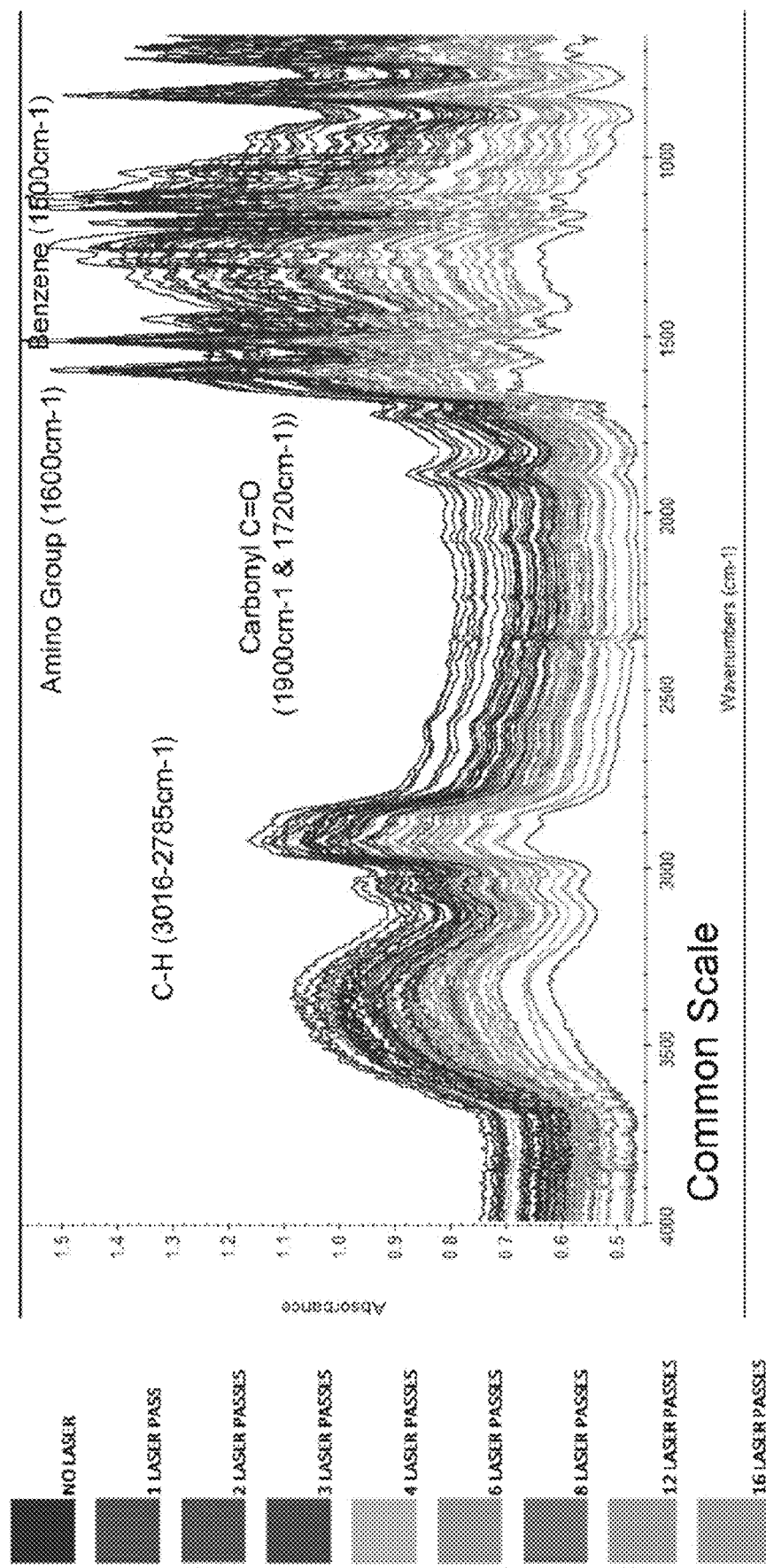
Figure 6B:
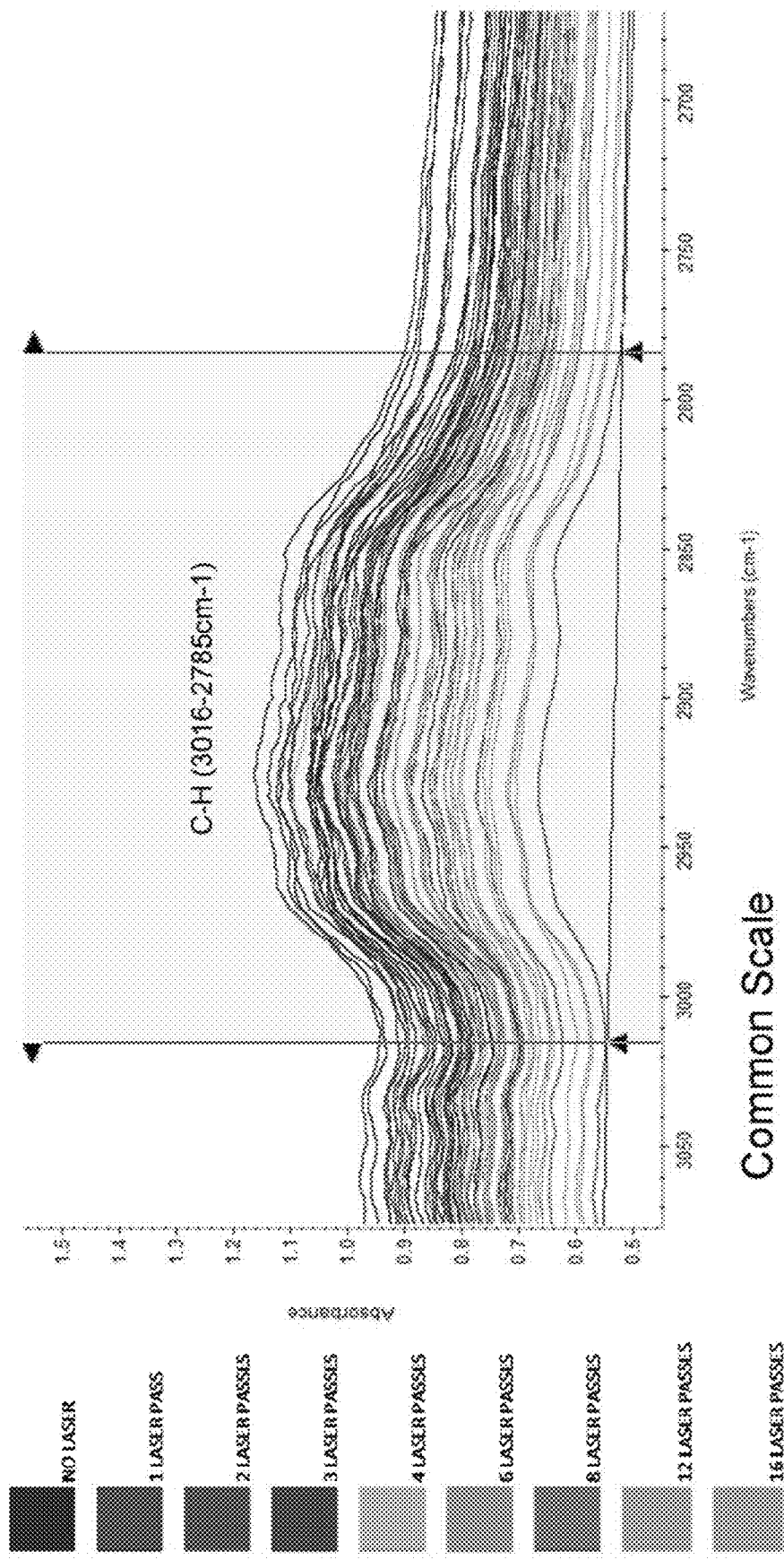
Figure 6C:
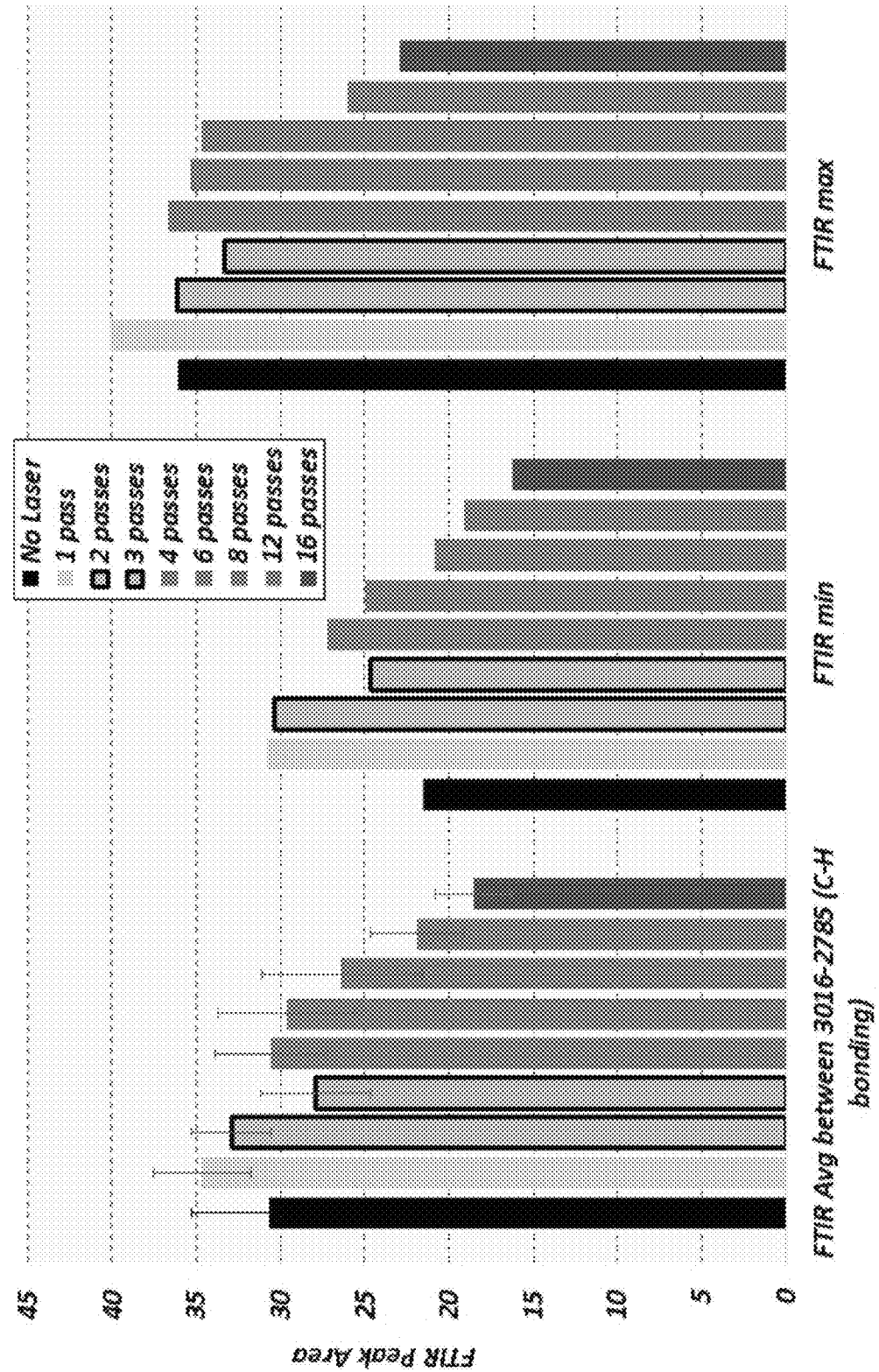
Figure 6D:
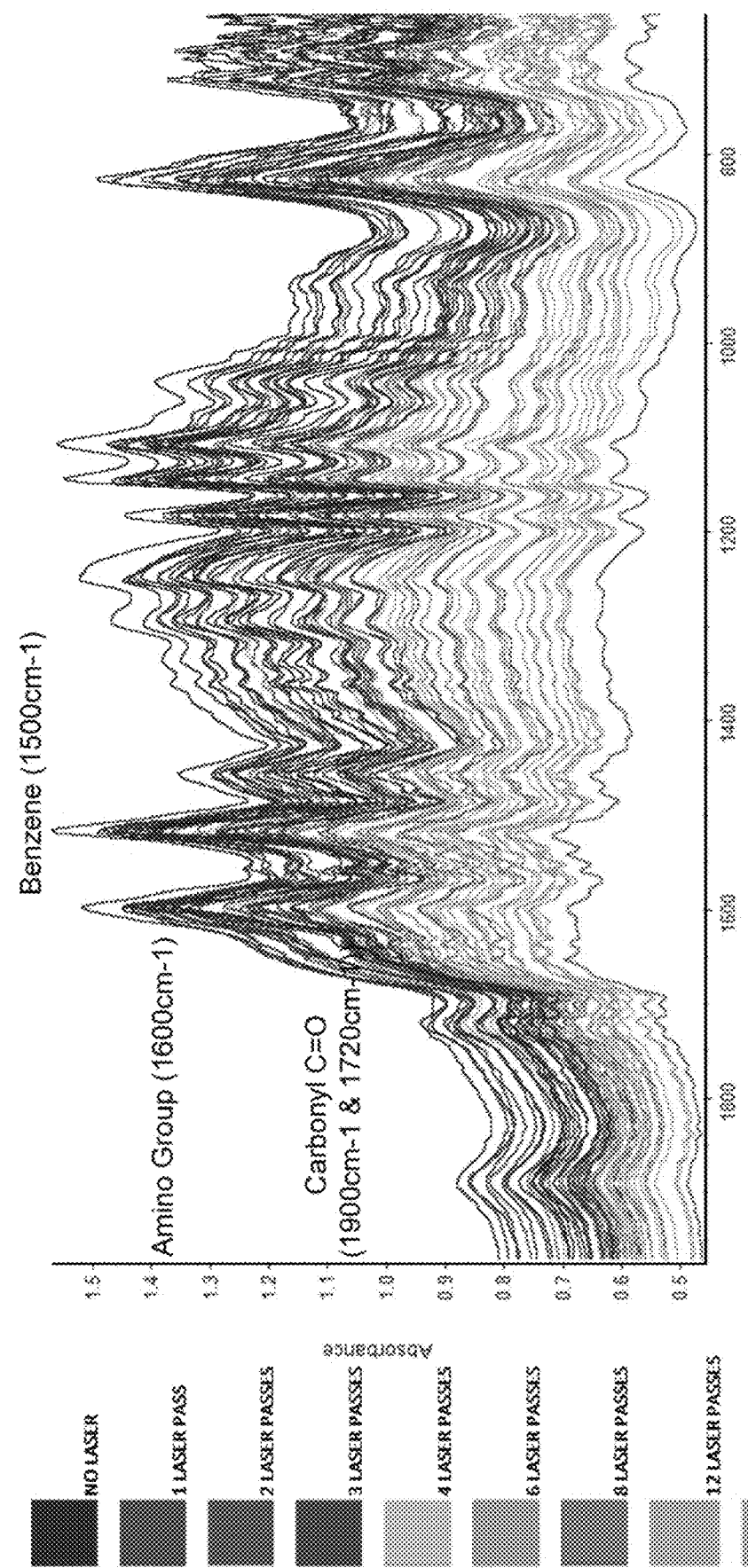
Figure 6E:
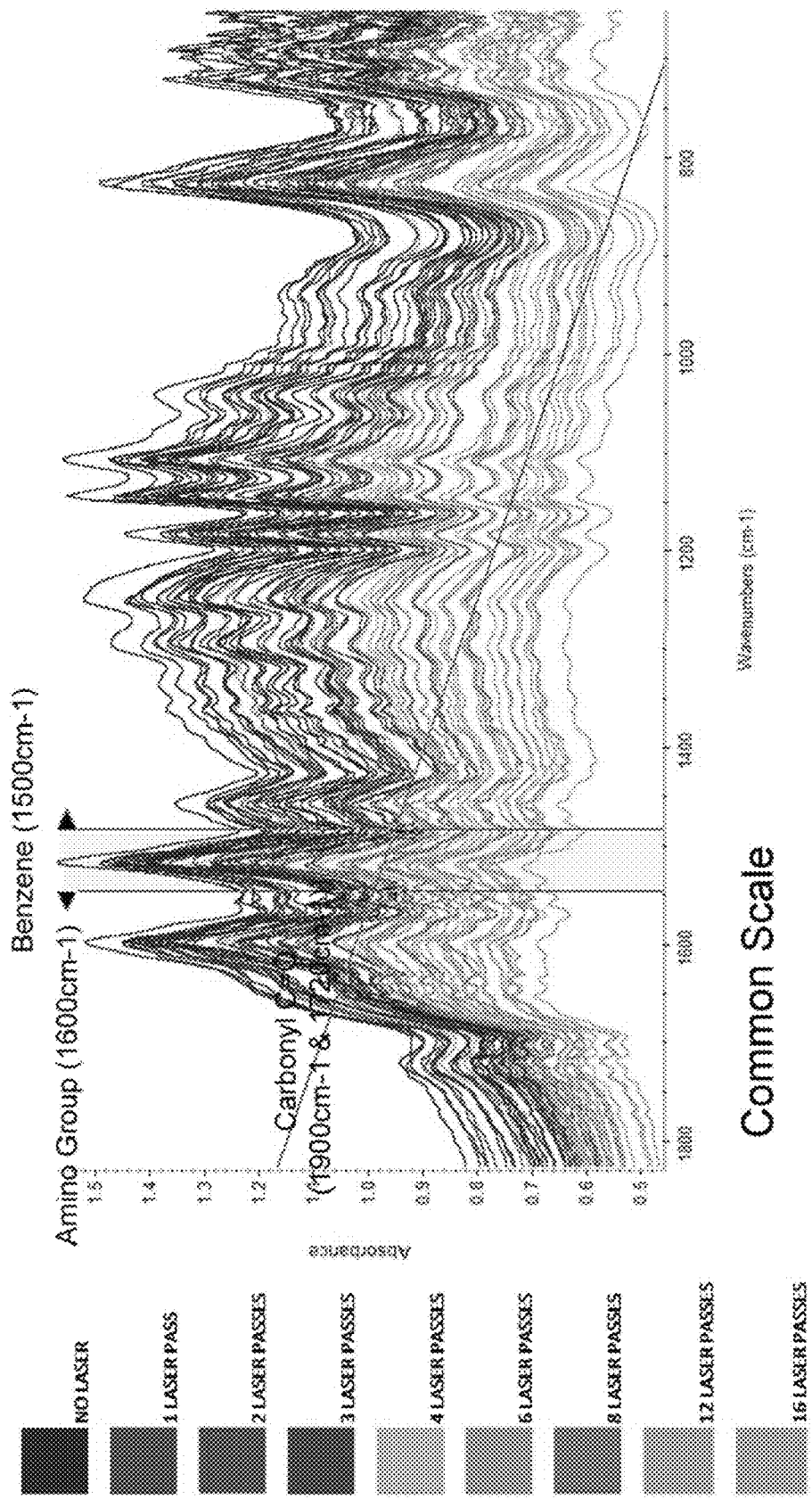
Figure 6F:
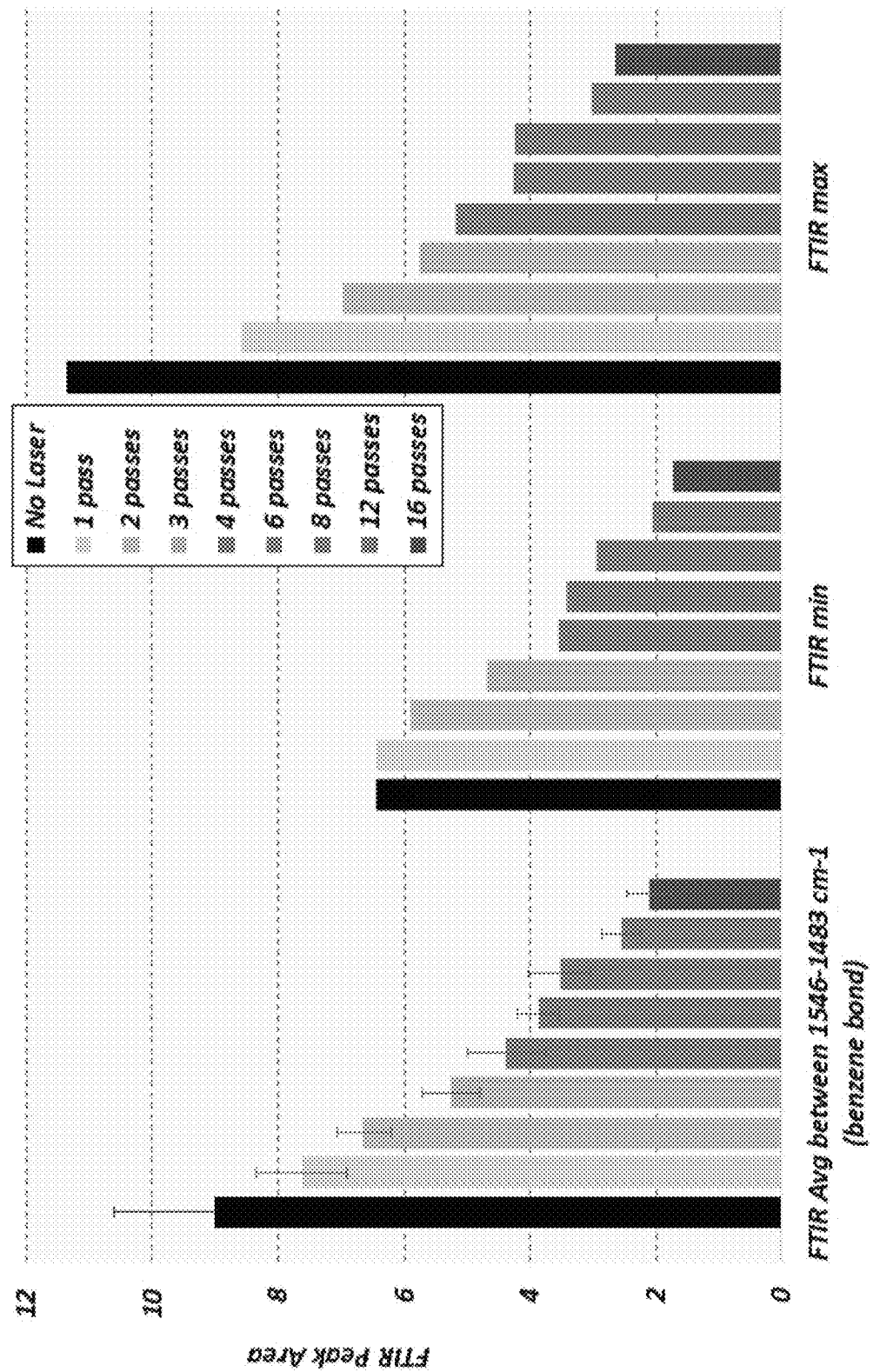
Figure 6G:
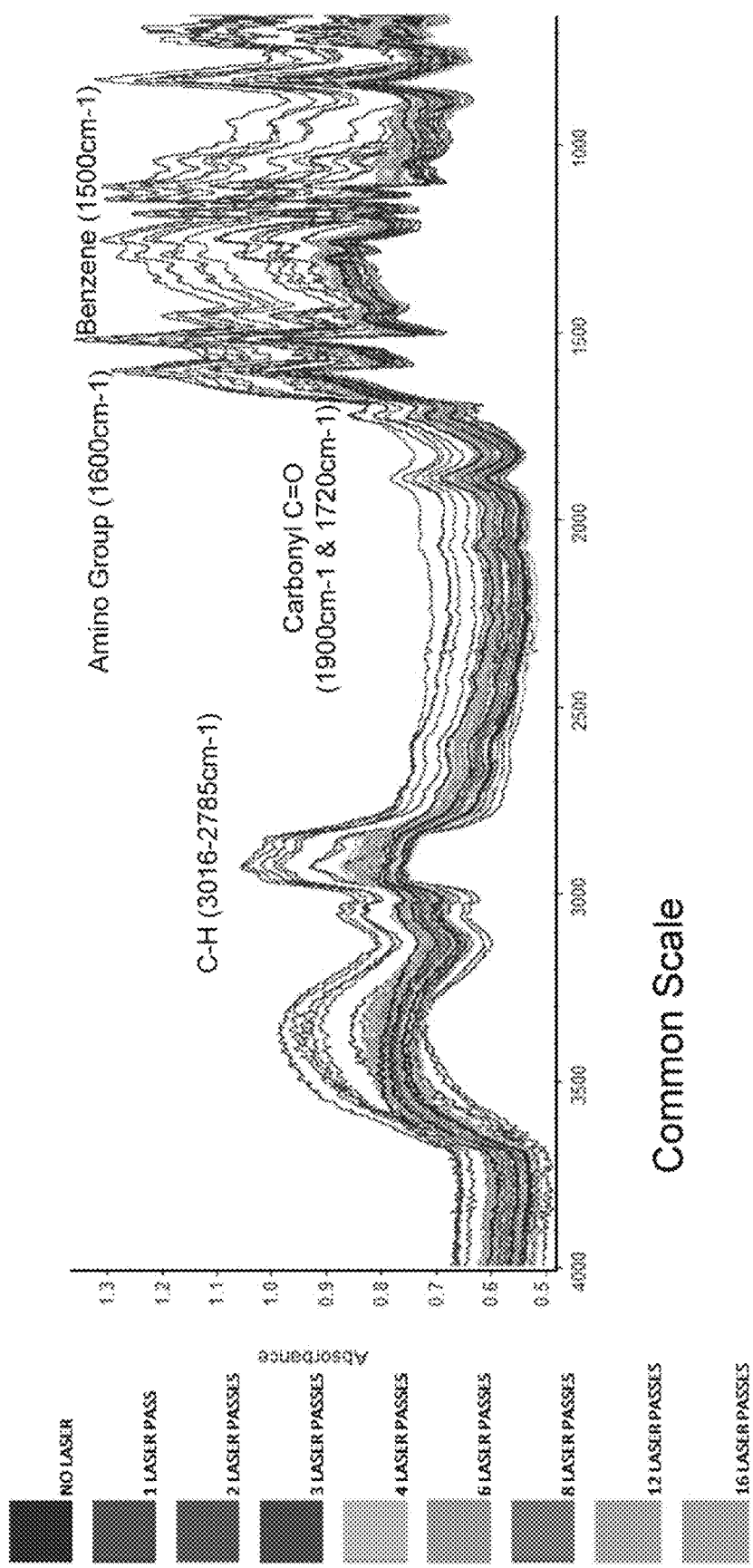
Figure 6H:
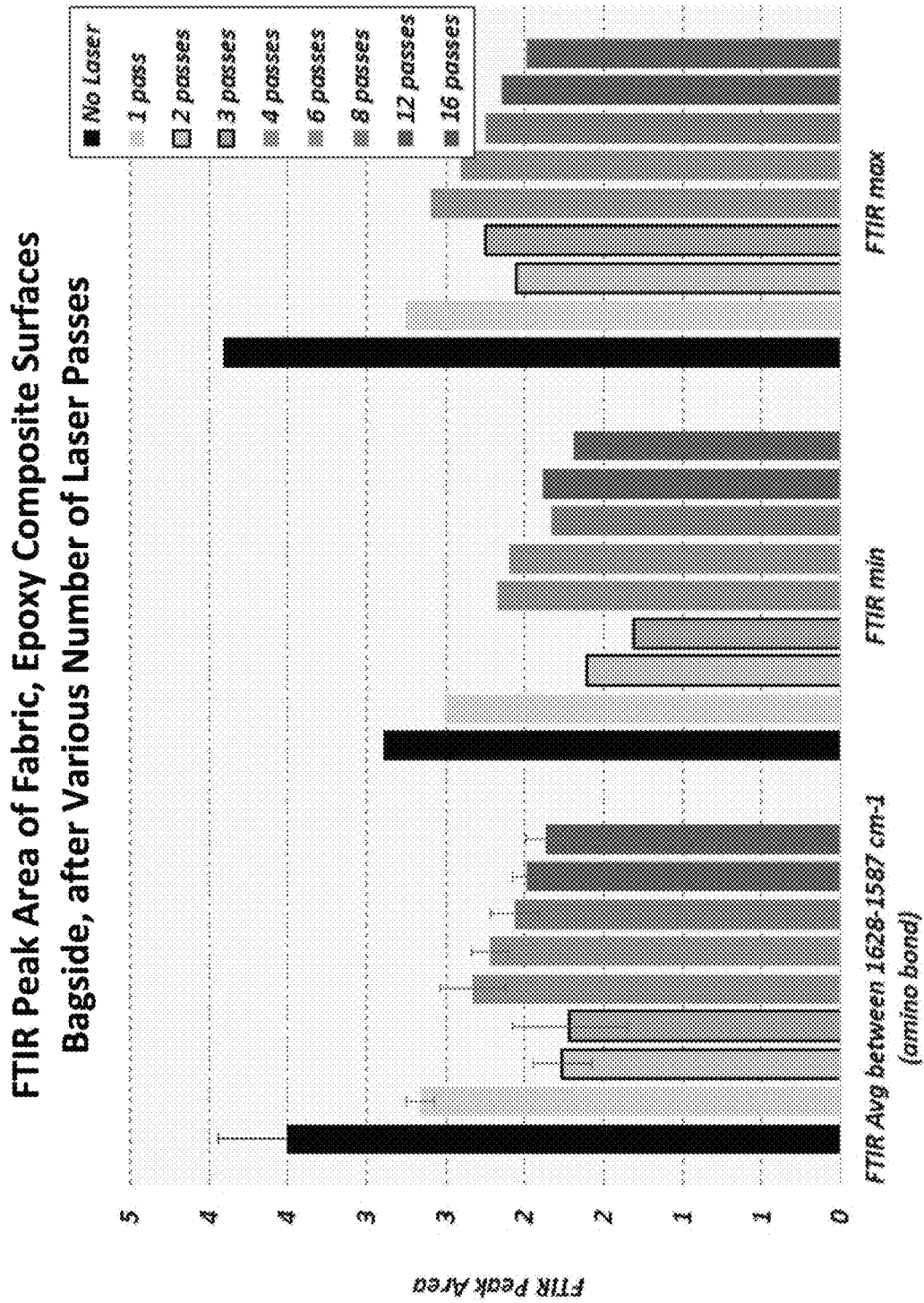
Figure 7:
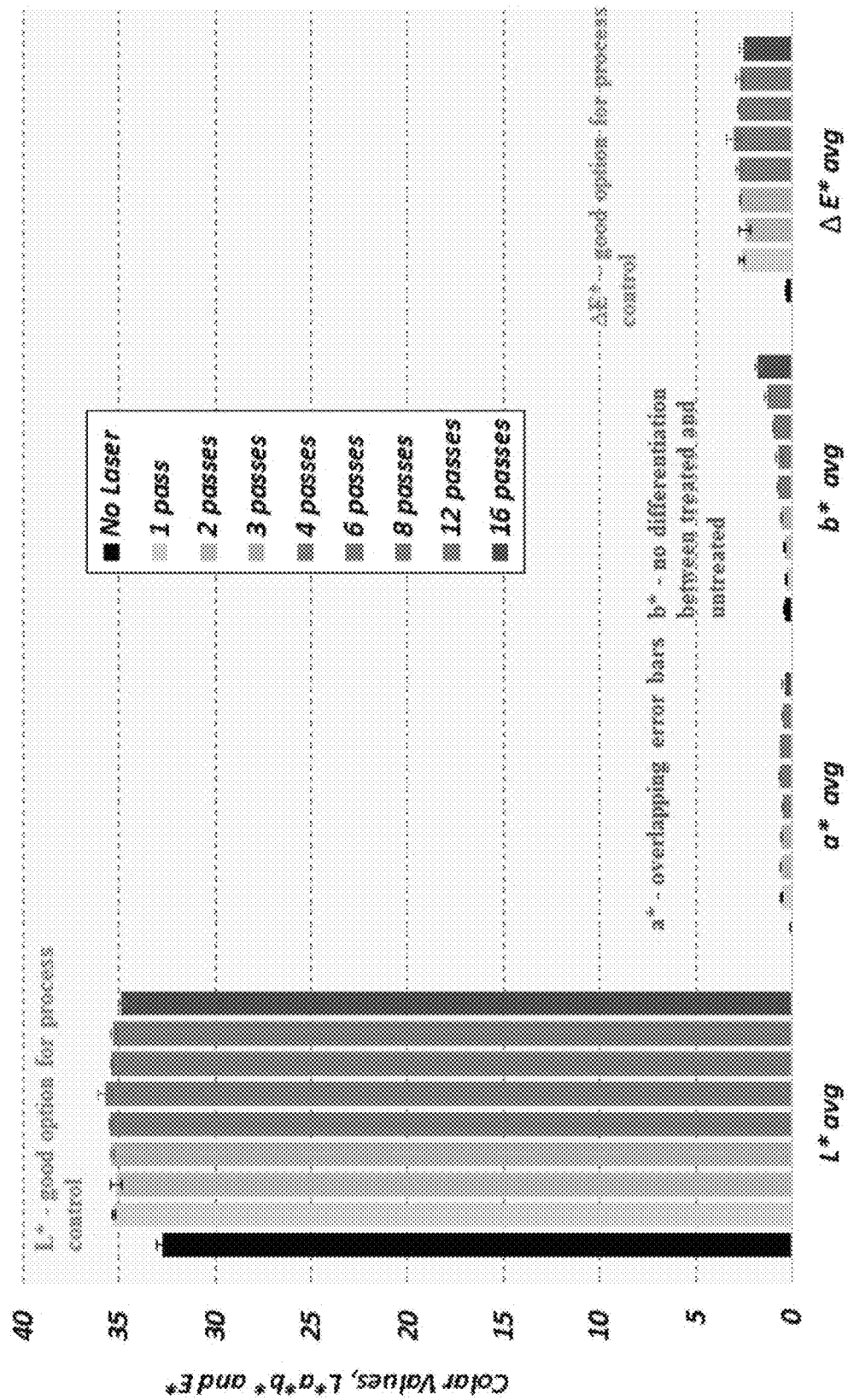
Figure 8A:
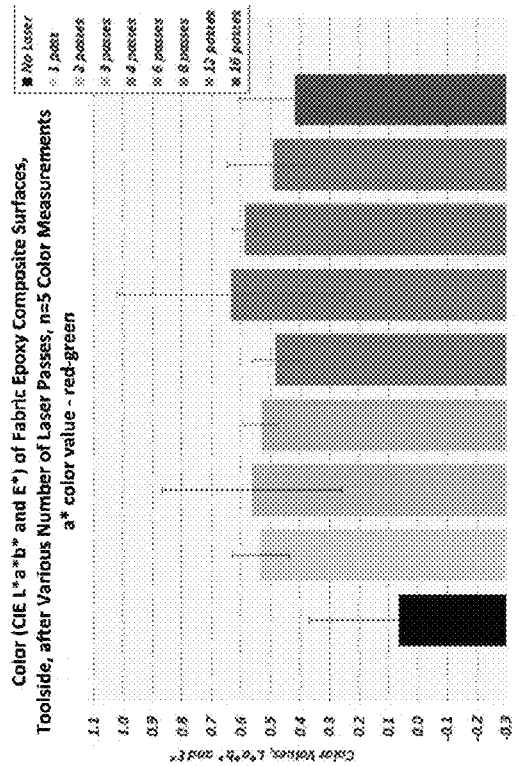
Figure 8B:
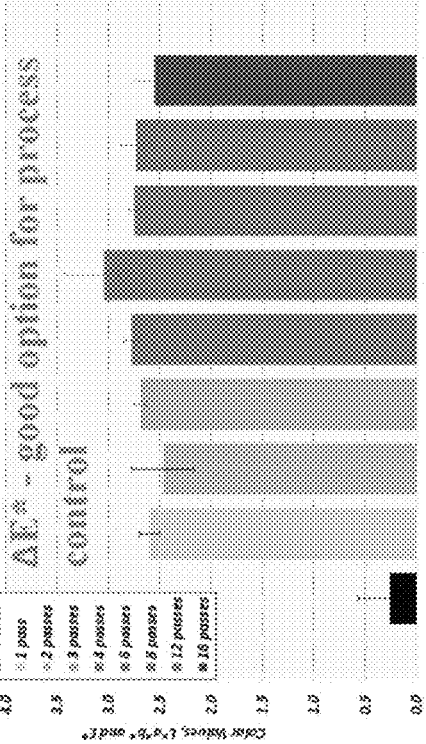
Figure 8C:
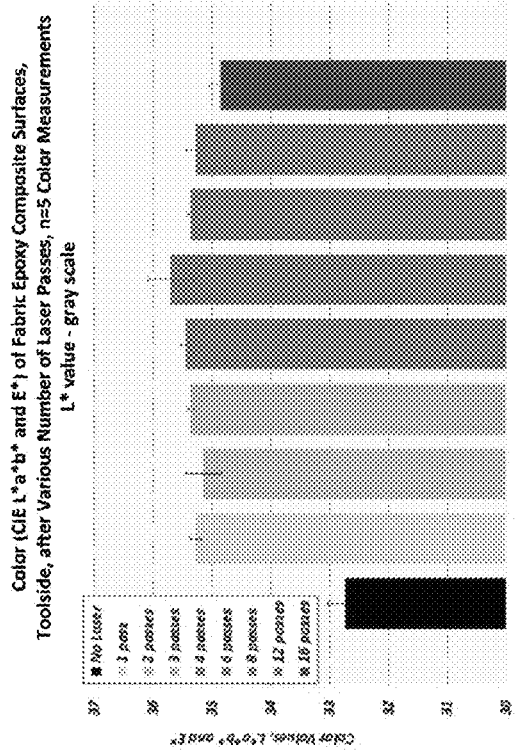
Figure 8D:
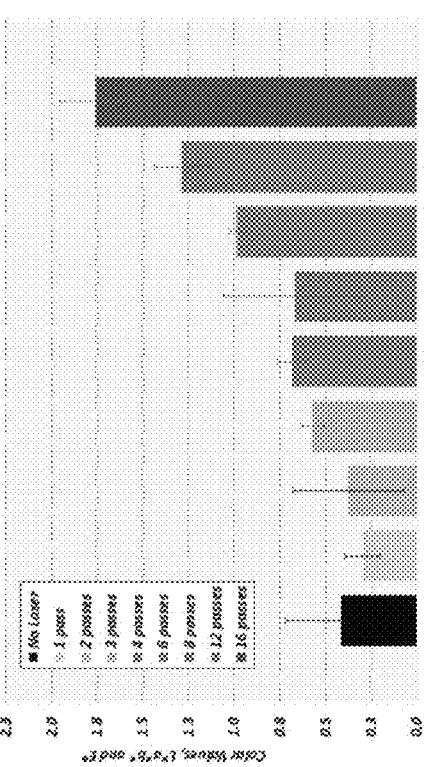
Figure 8E:
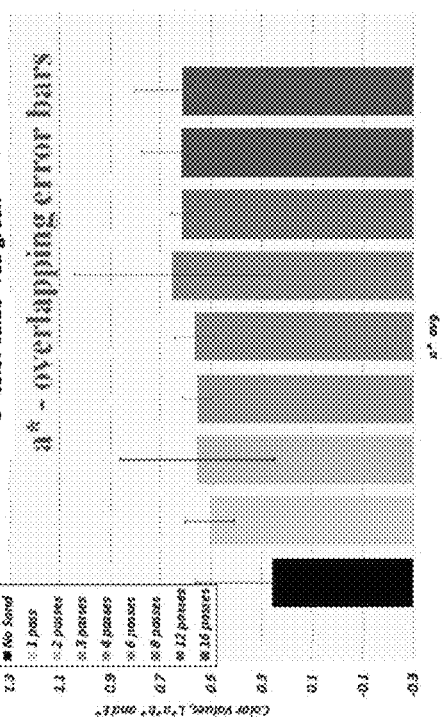
Figure 8F:
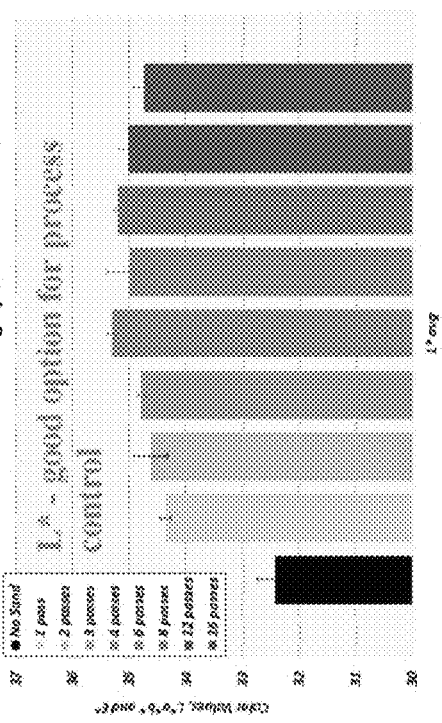
Figure 8G:
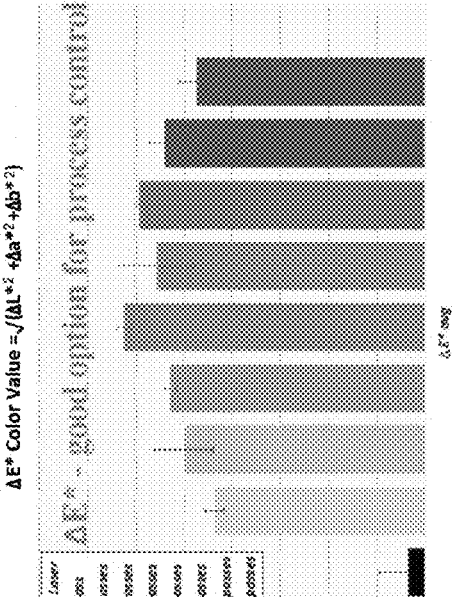
Figure 8H:
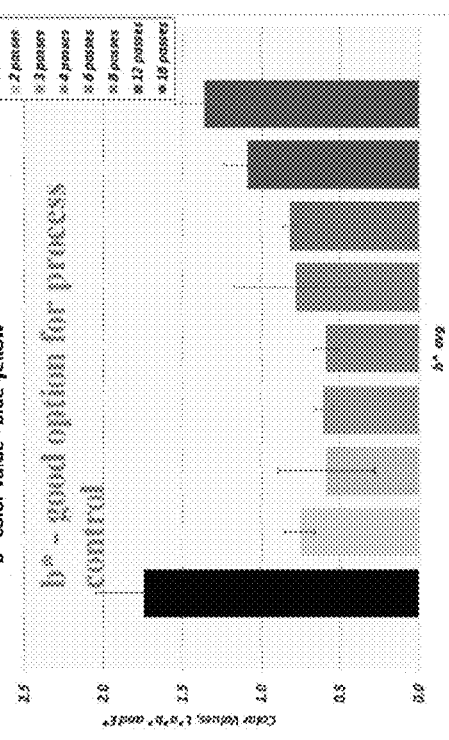
Figures 8I, 8J:
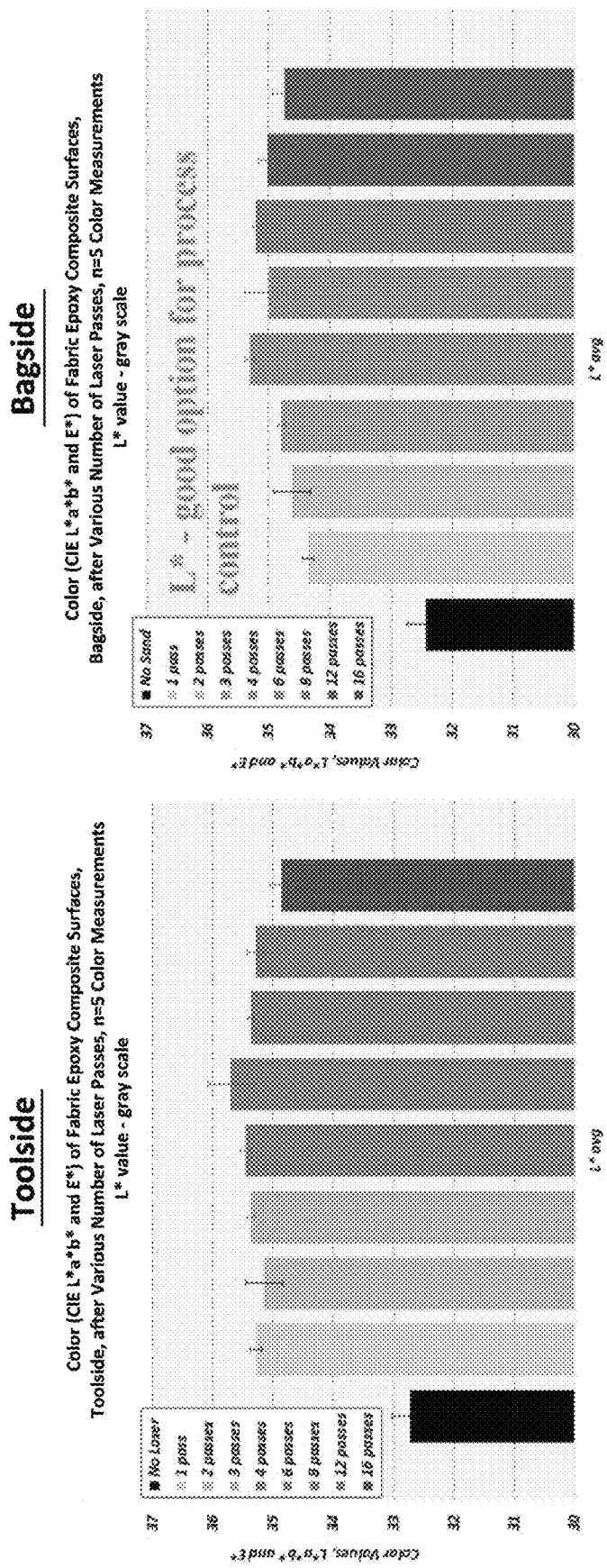
Figure 9A:
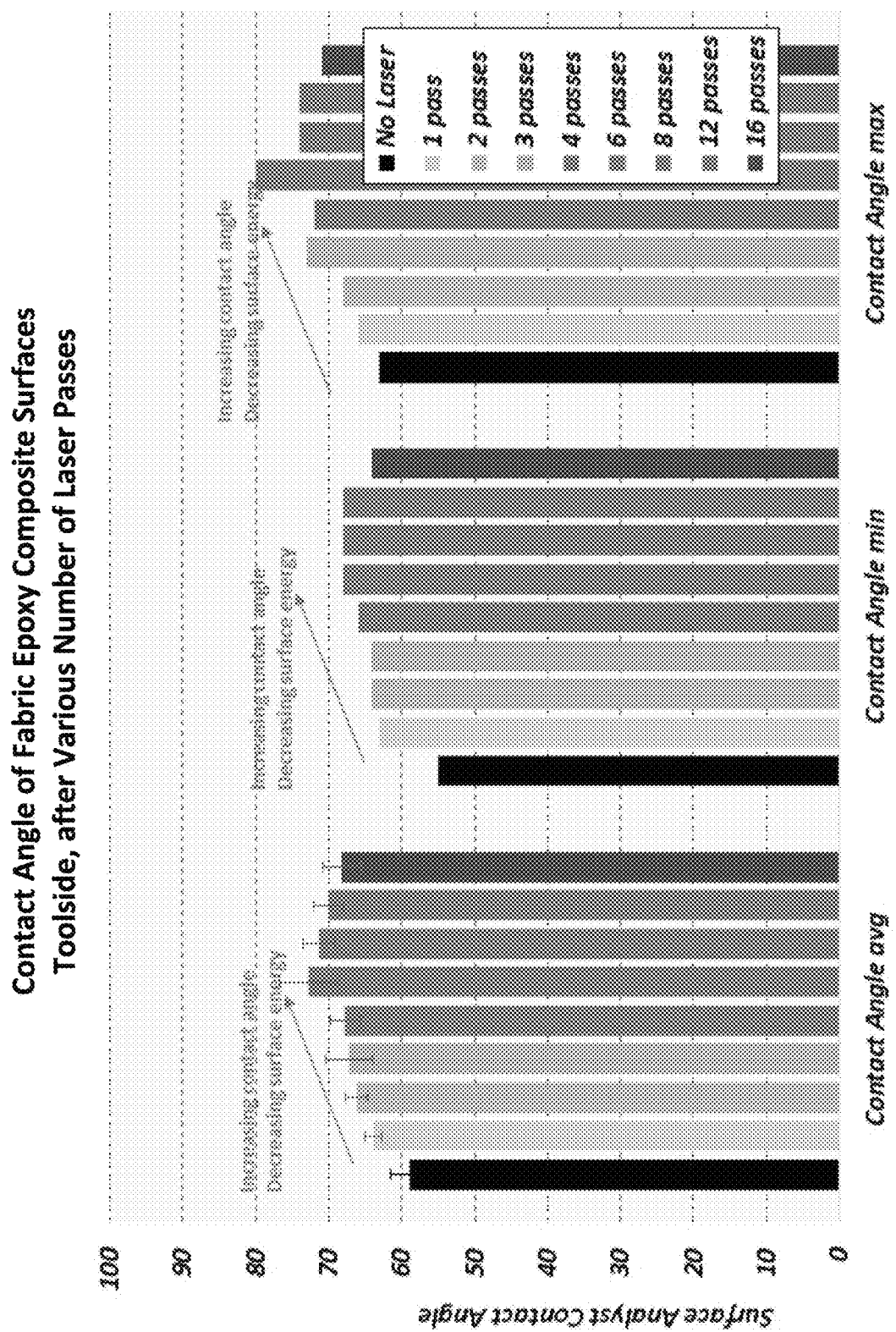
Figure 9B:
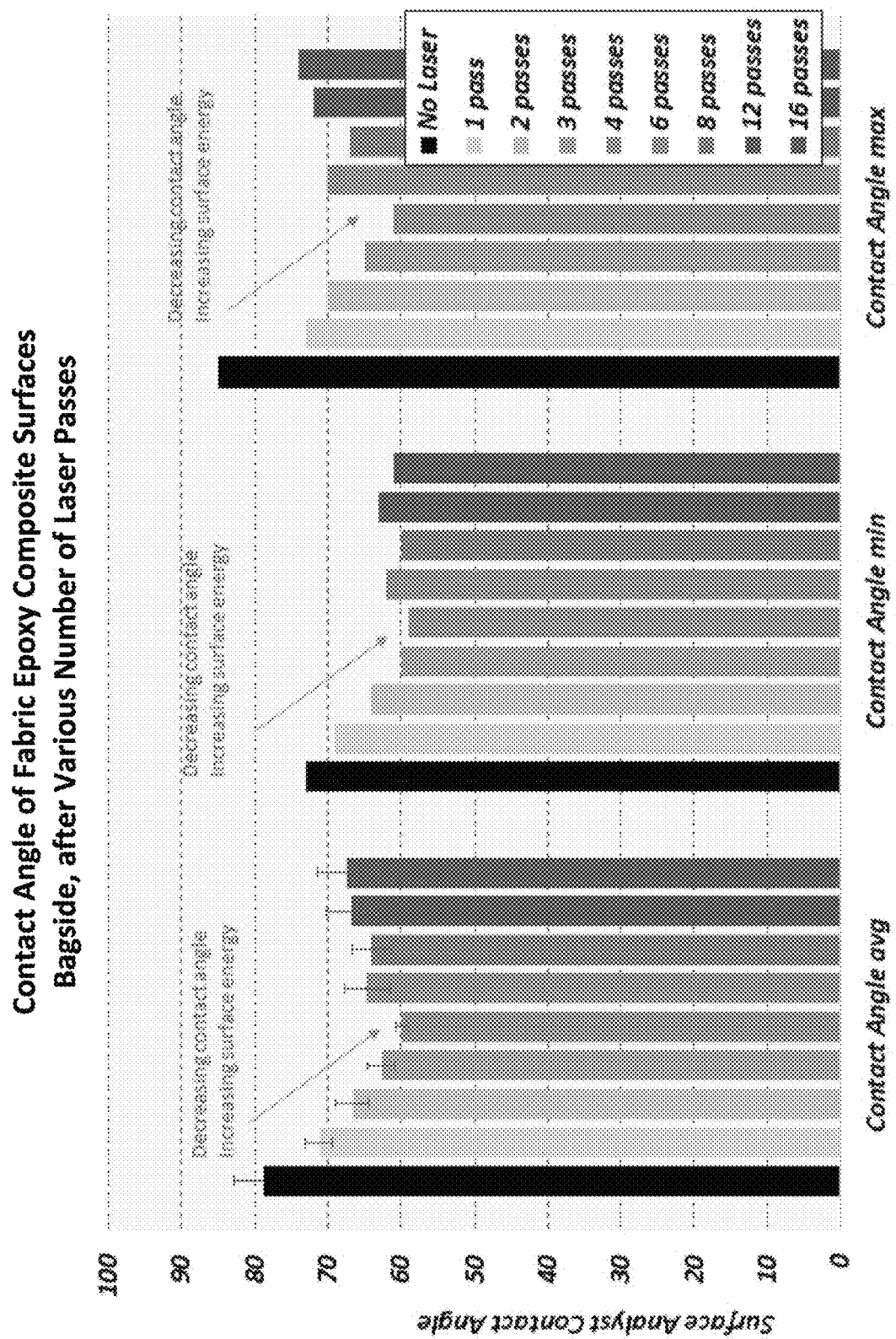
Figure 10A:
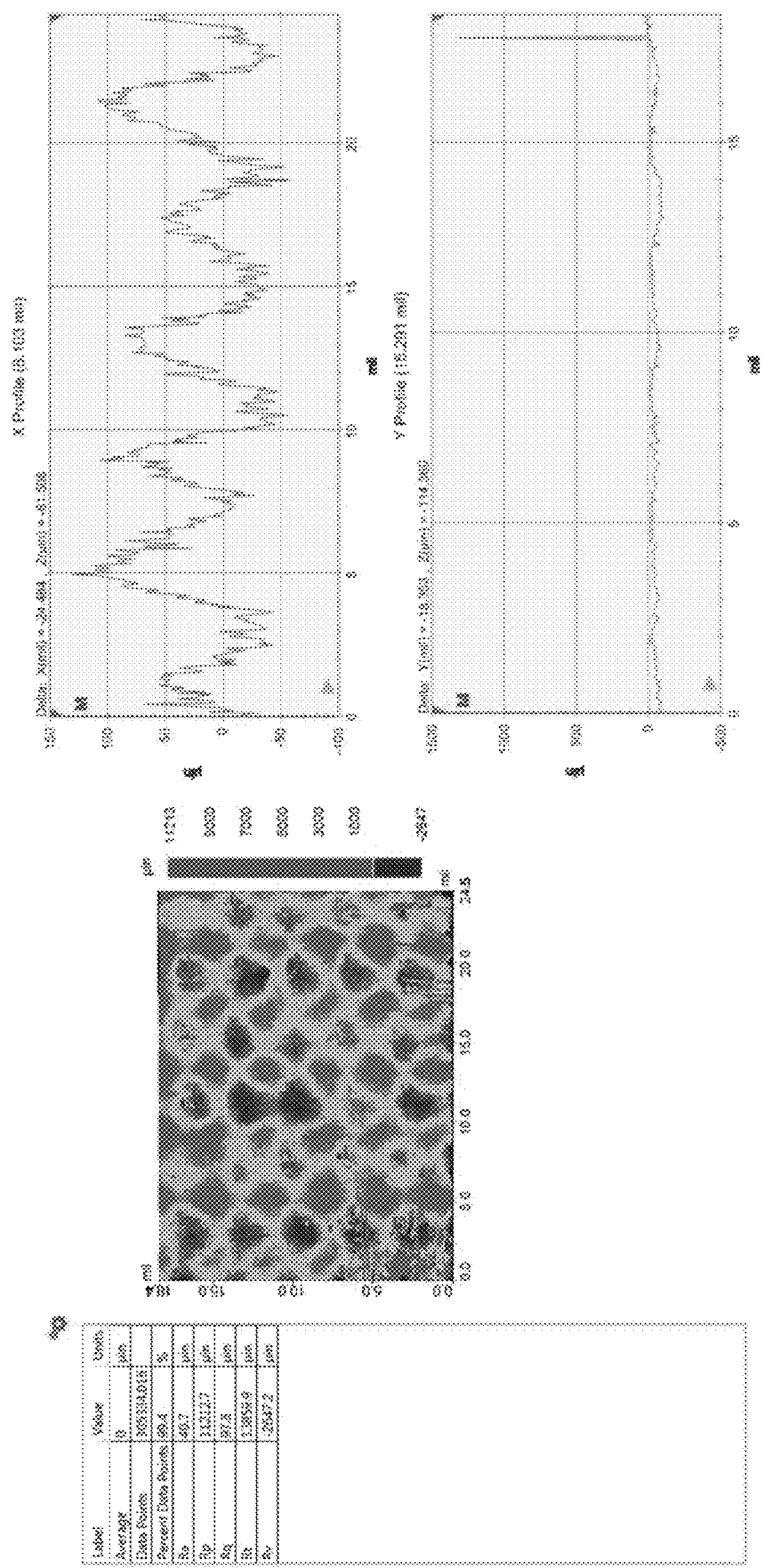
Figure 10B:
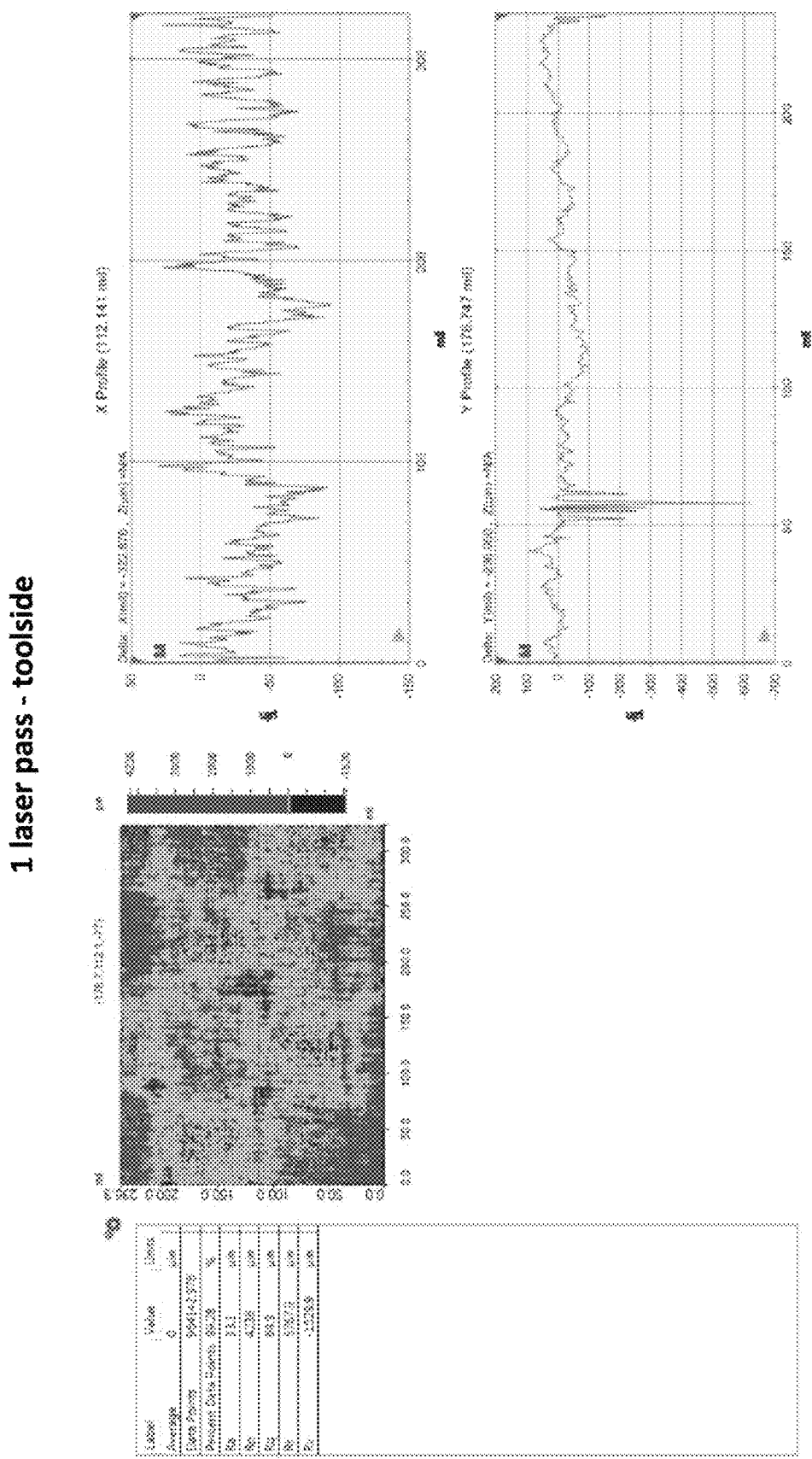
Figure 10C:
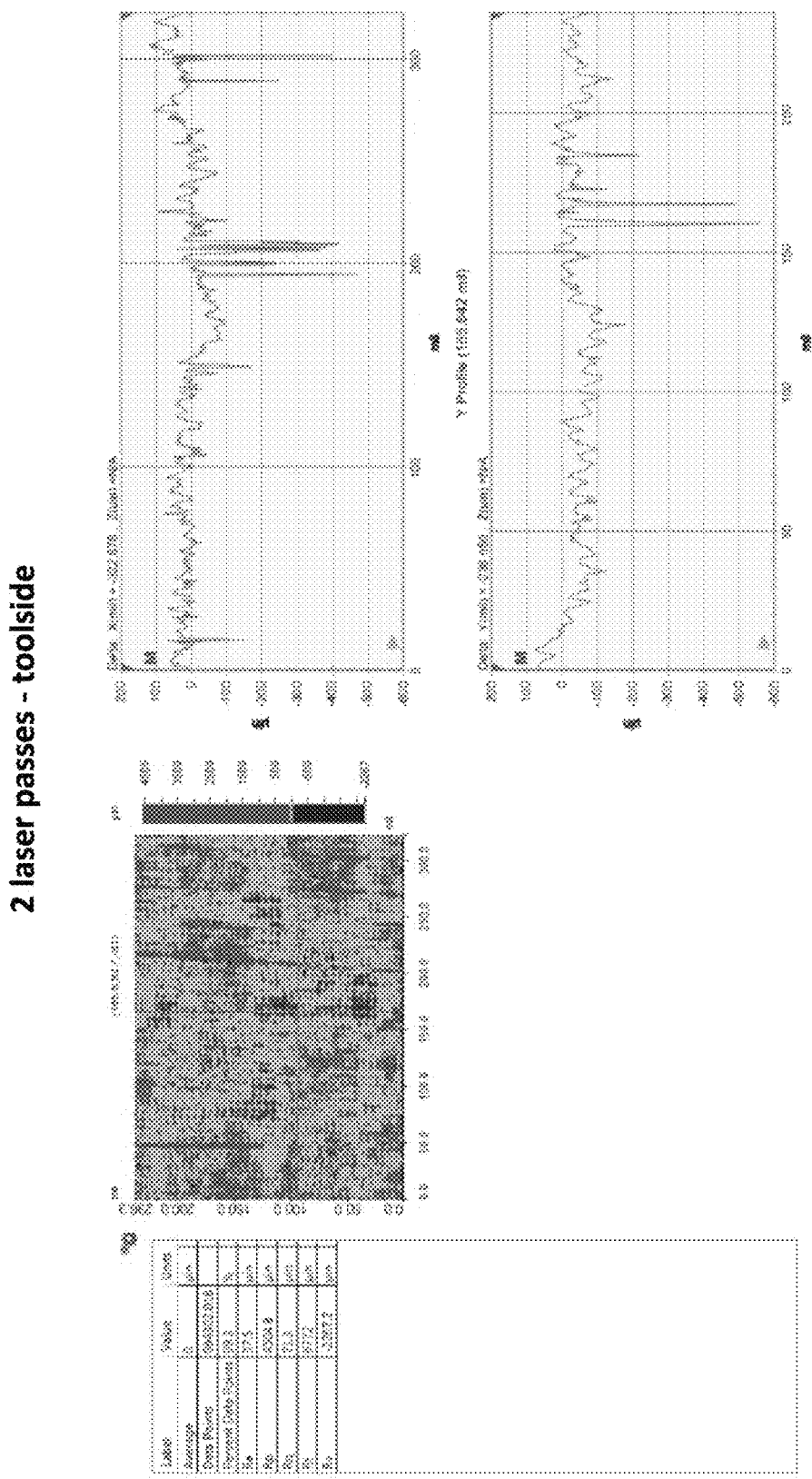
Figure 10D:
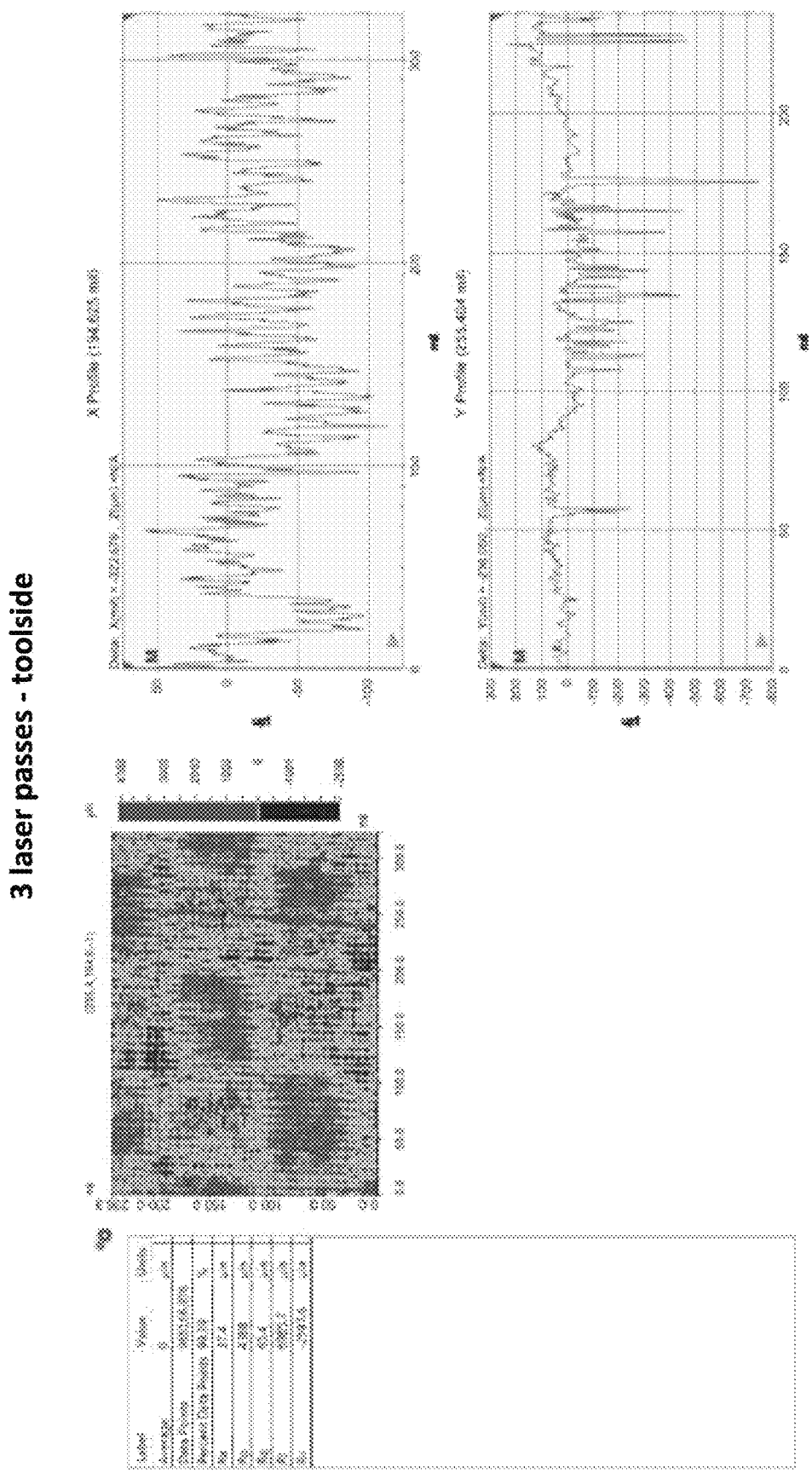
Figure 10E:
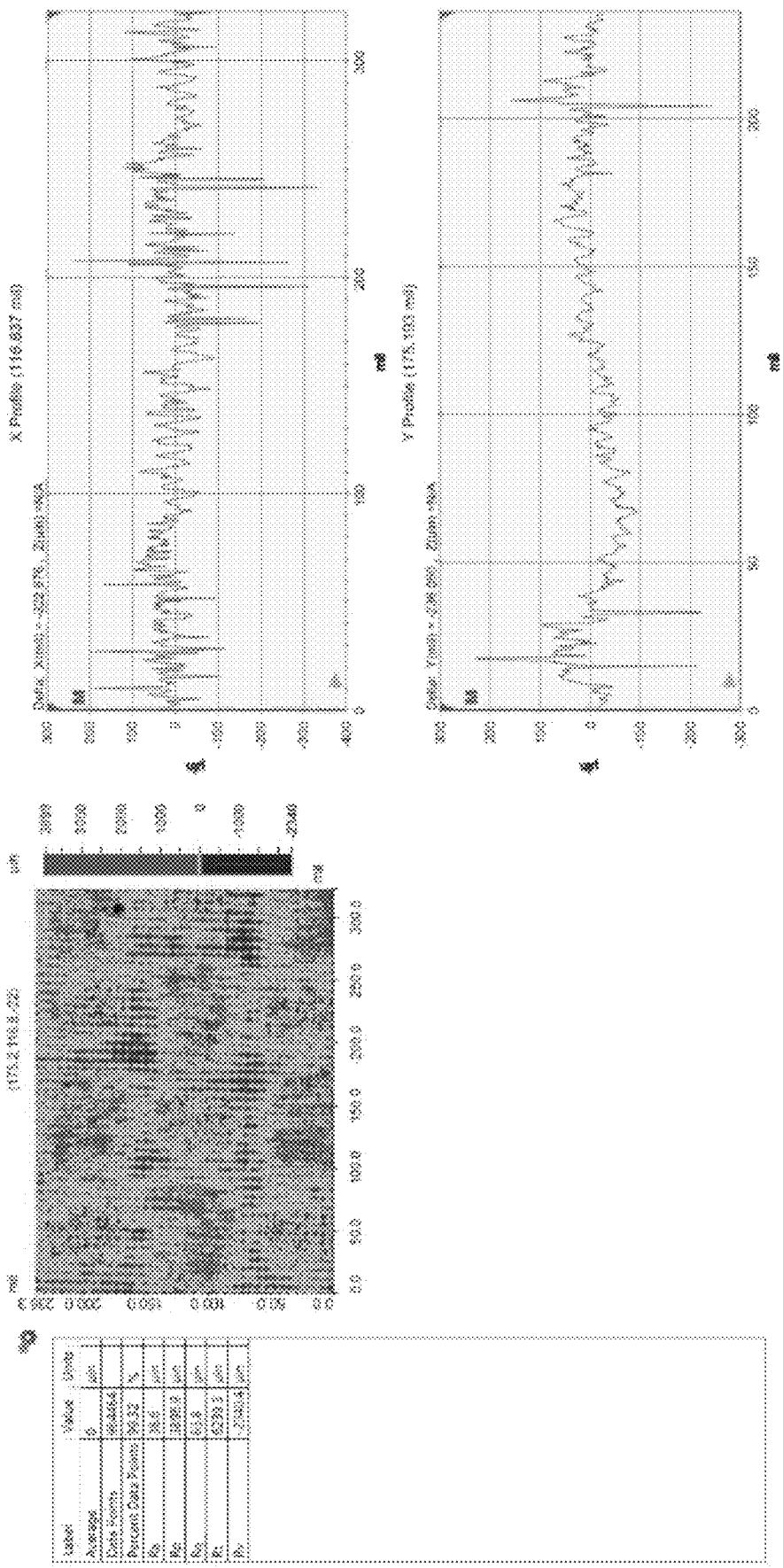
Figure 10F:
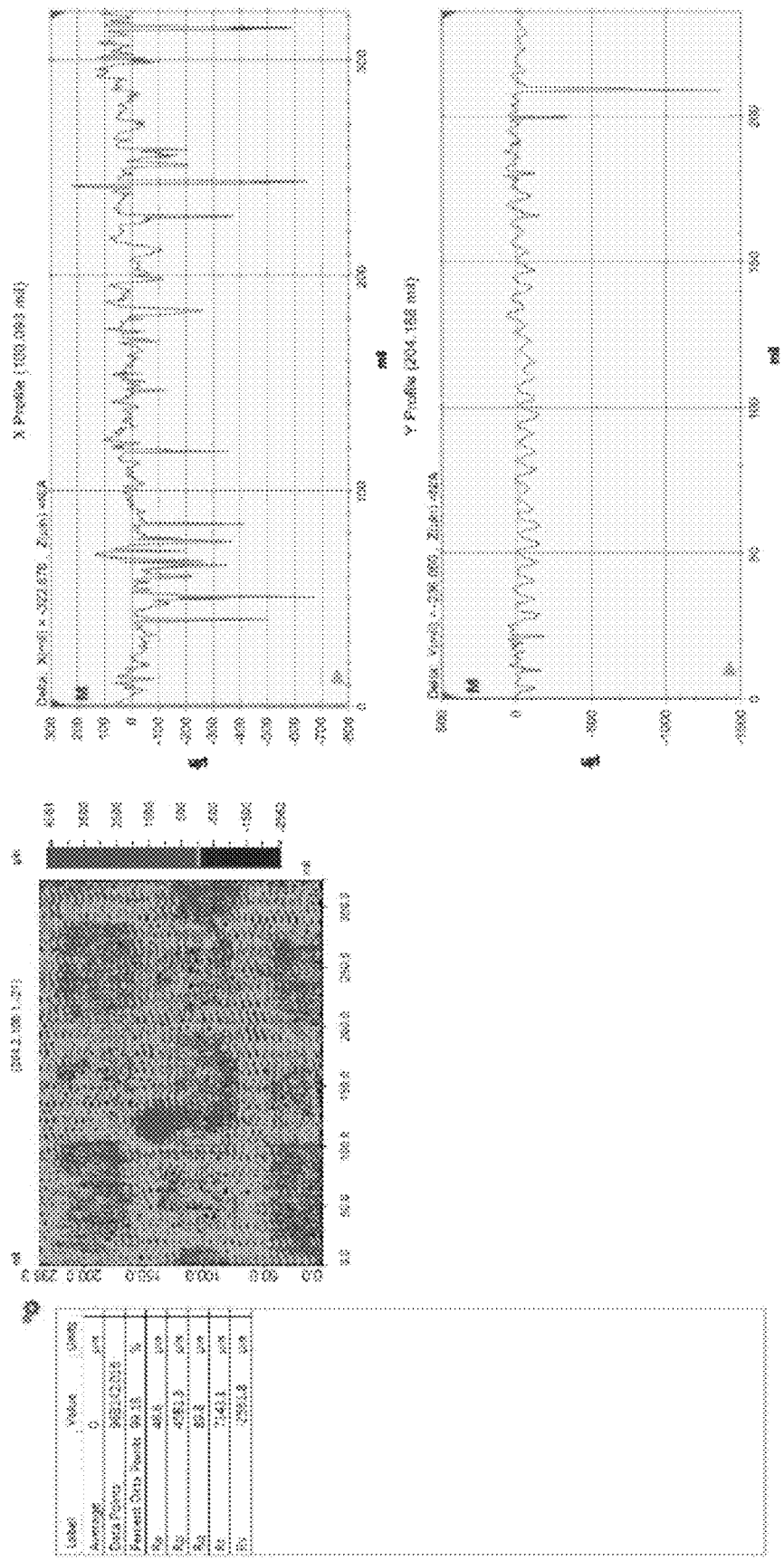
Figure 10G:
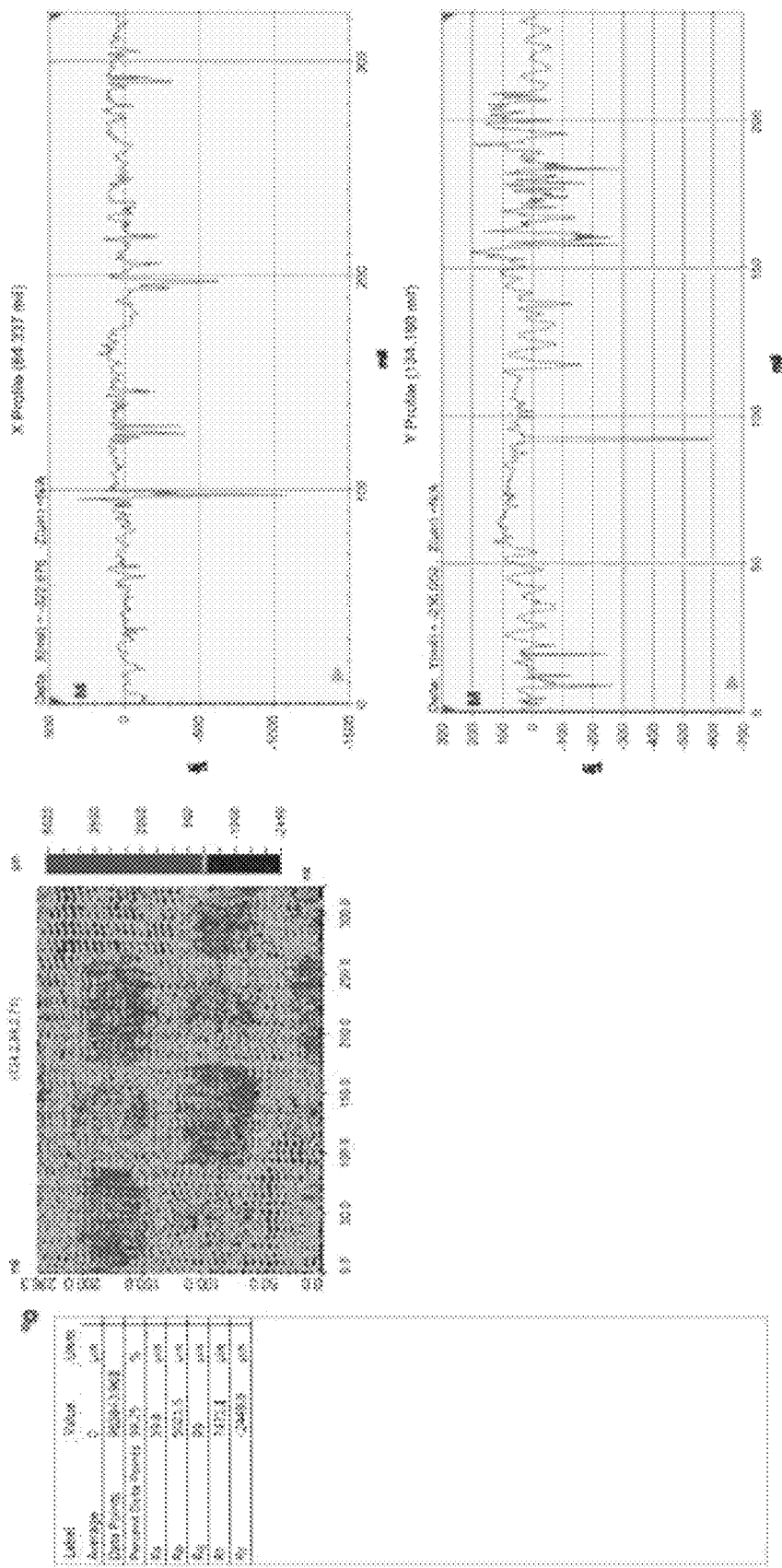
Figure 10H:
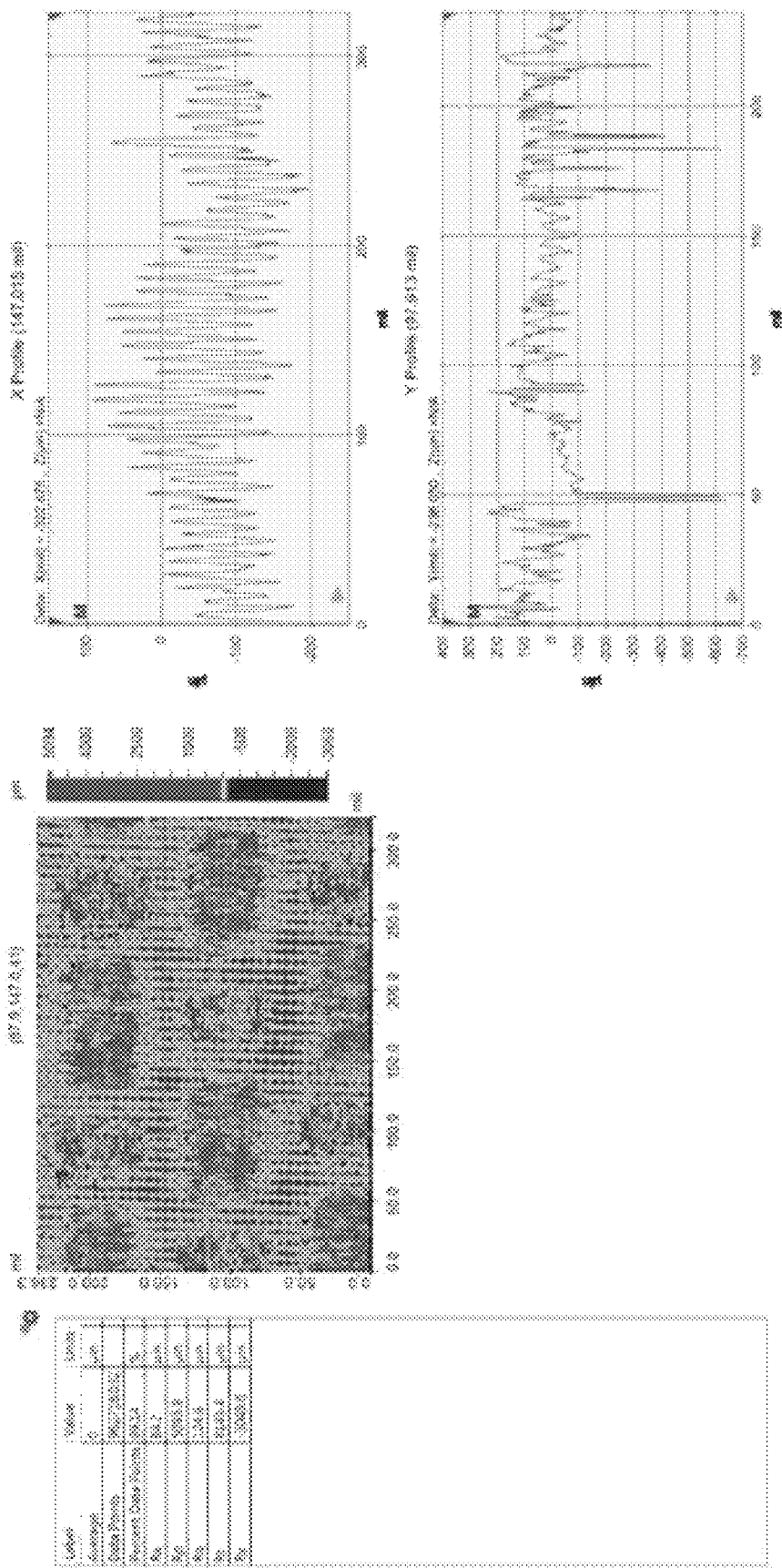
Figure 10I:
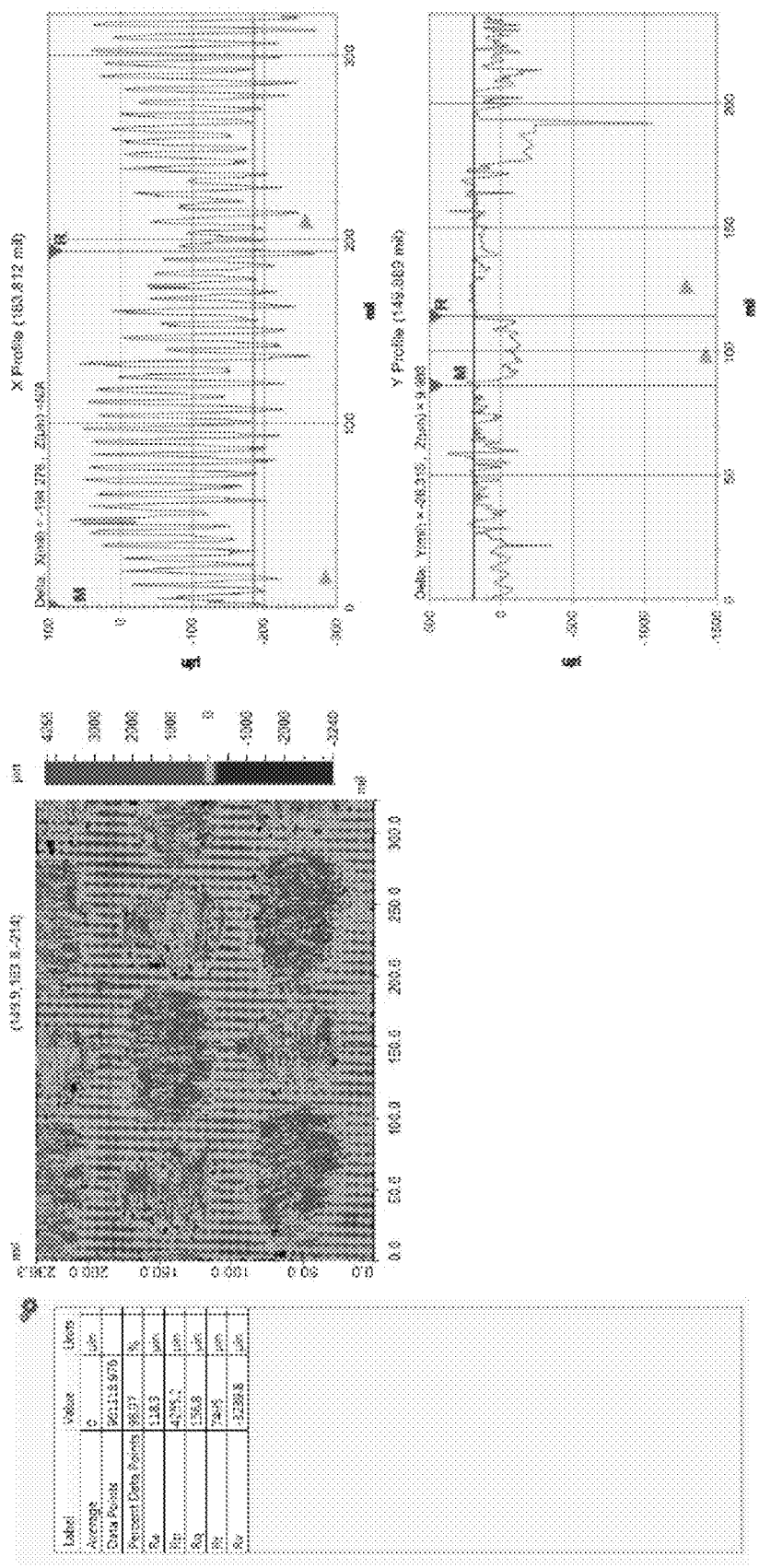
Figure 11A:
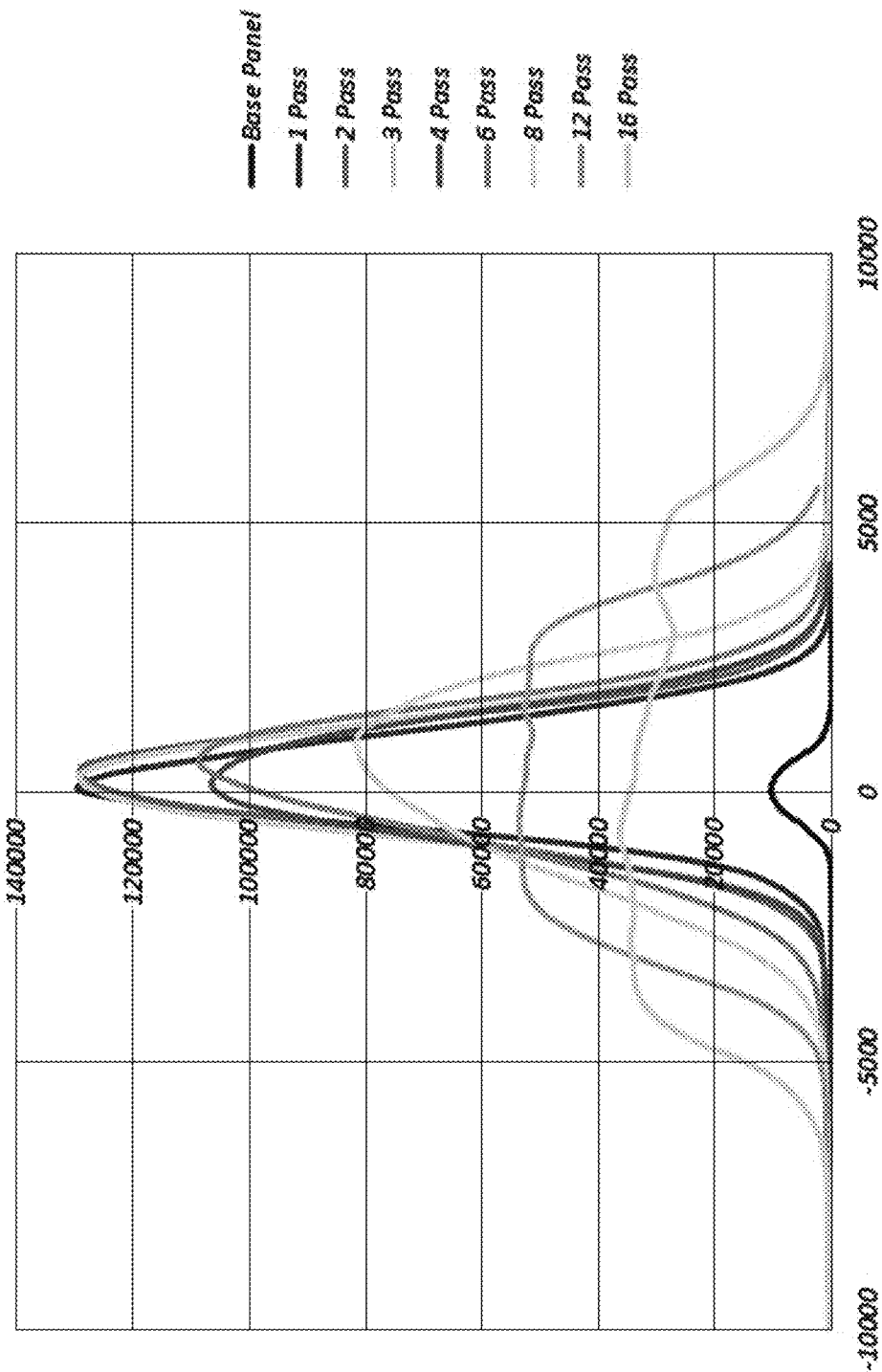
Figure 11B:
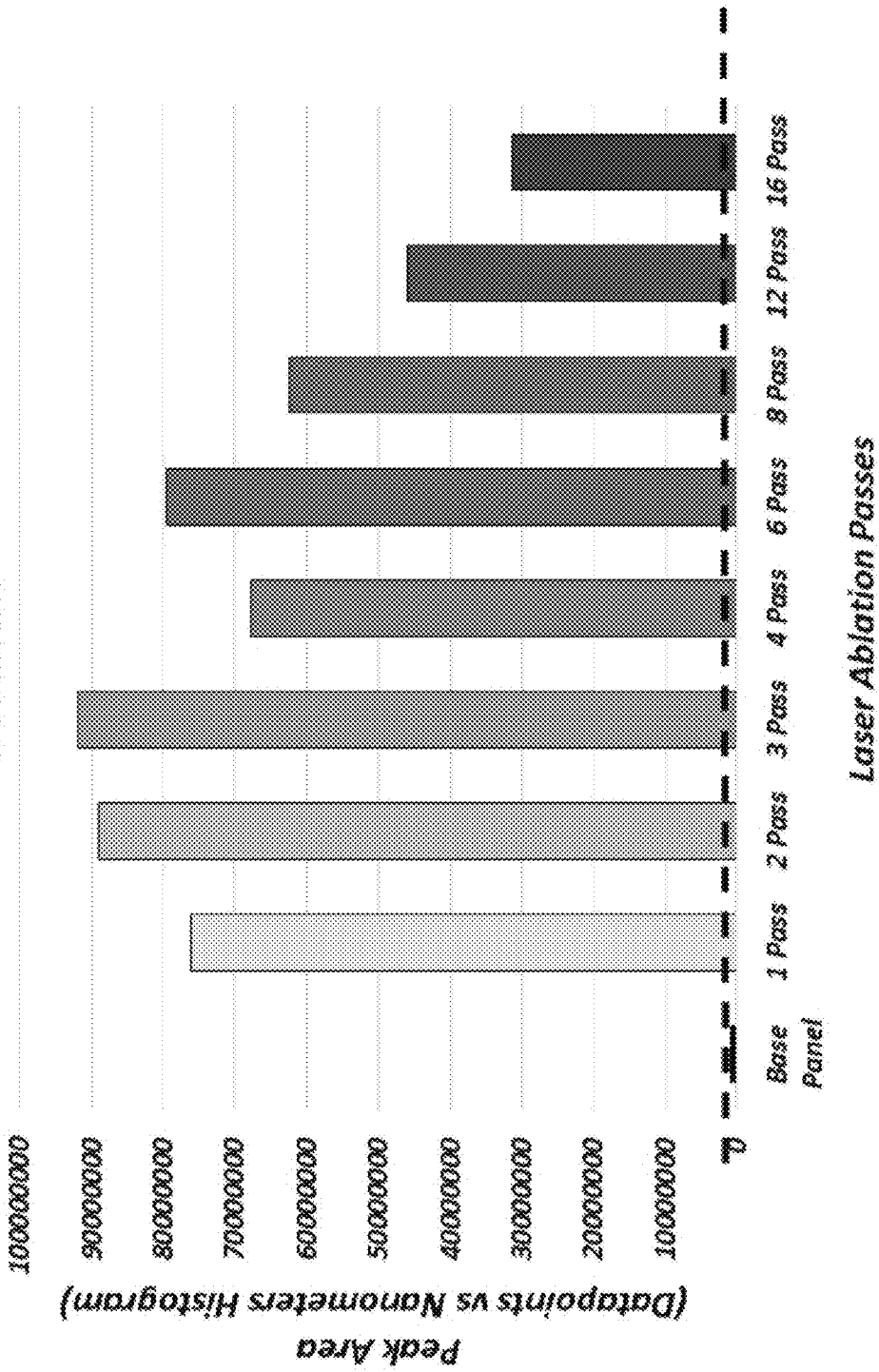
Figure 12A:
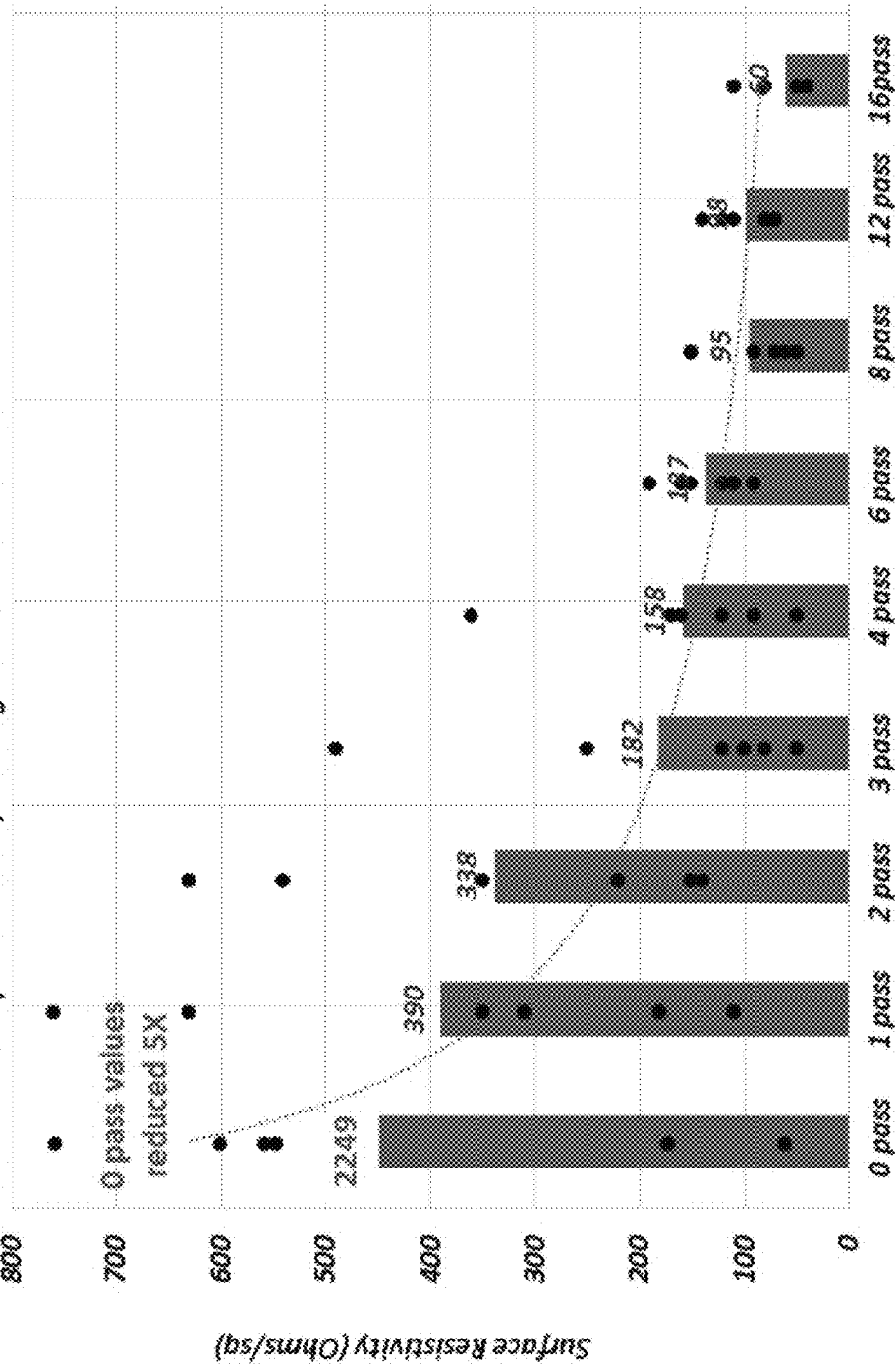
Figure 12B:
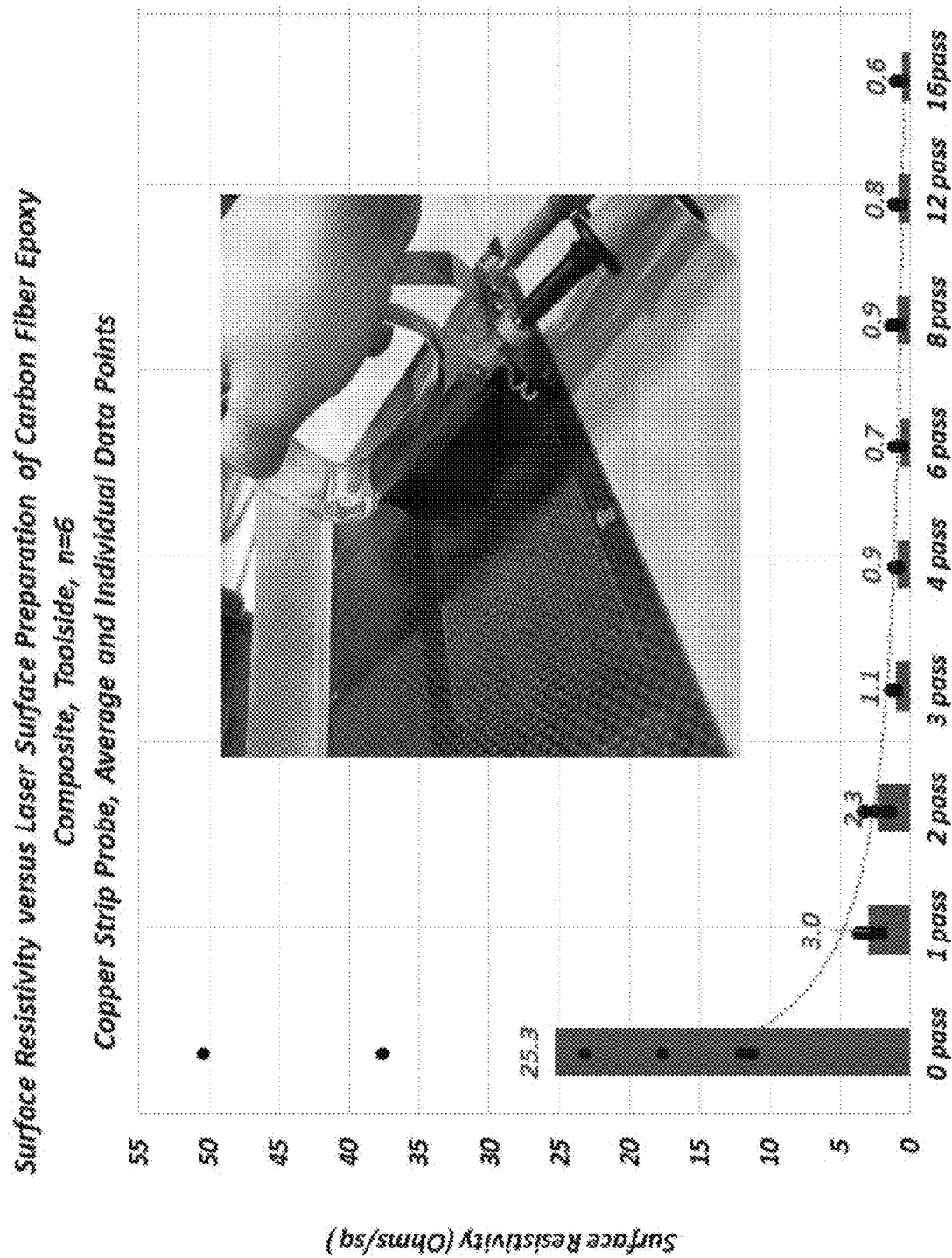
Figure 12C:
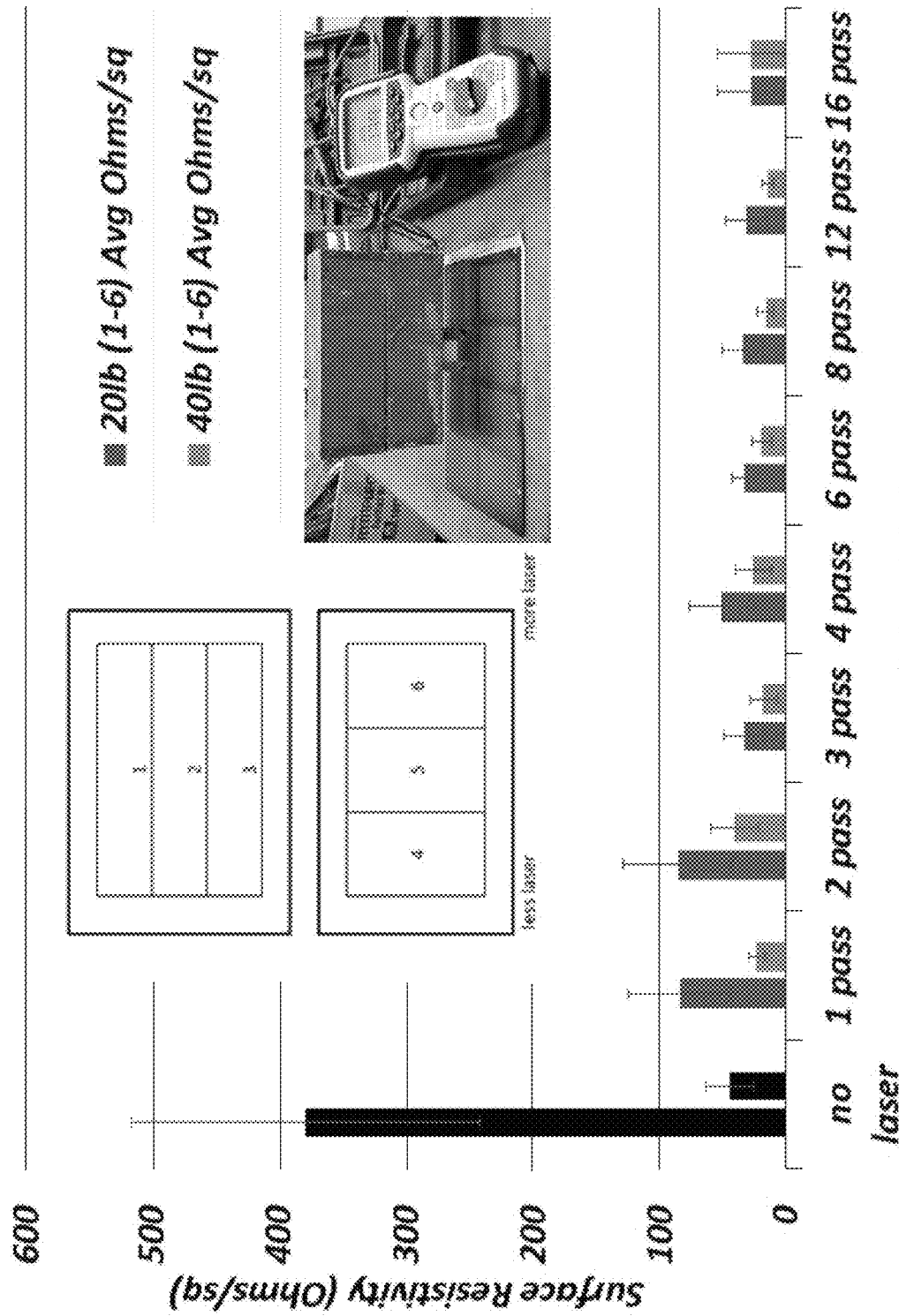
Figure 13:
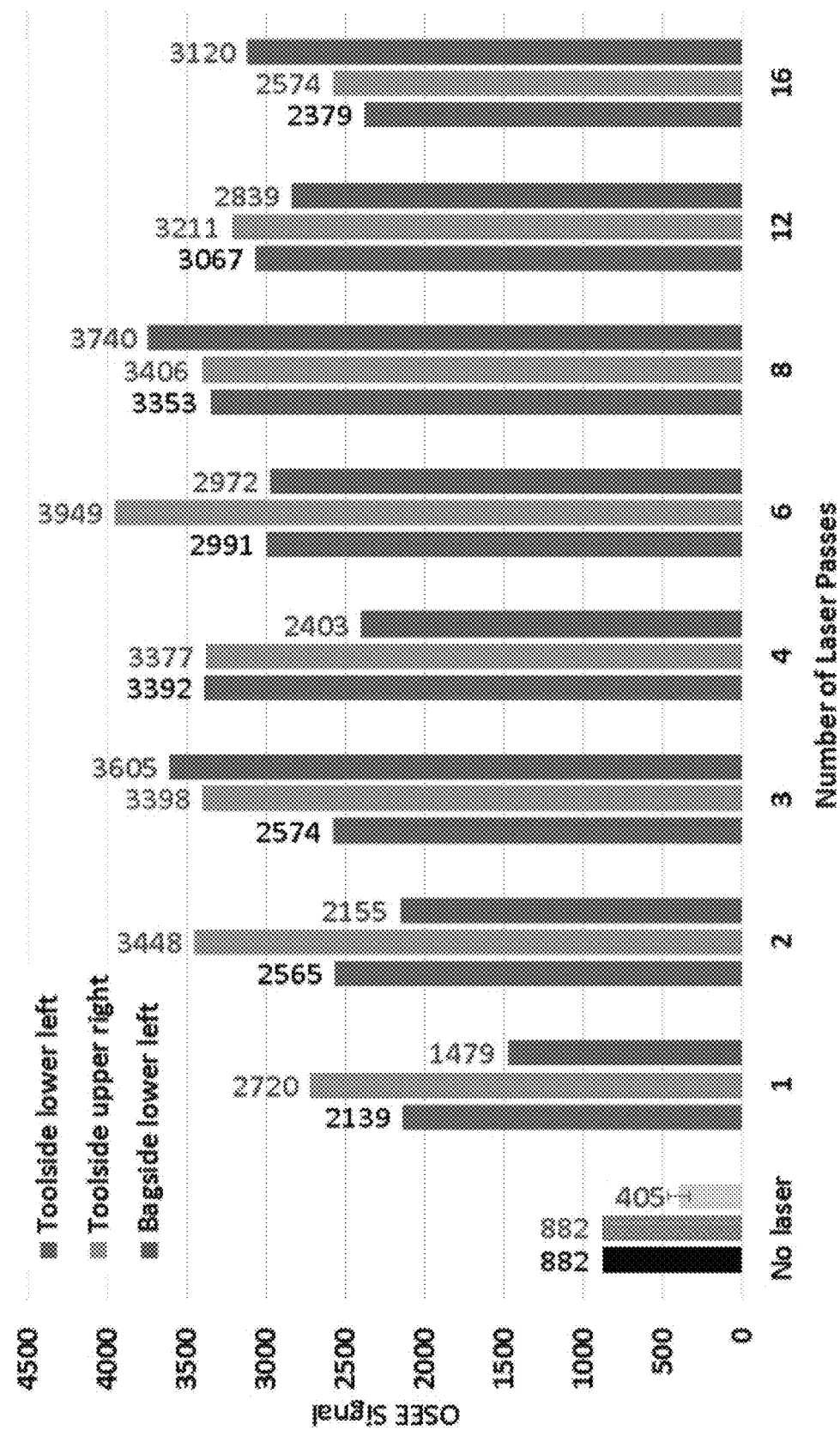

Having thus described variations of the disclosure in general terms, reference will now be made to the accompanying drawings, which are not necessarily drawn to scale, and wherein:

FIG. 1 is an illustration showing a cross-sectional view of a carbon-containing composite material substrate, according to present aspects;

FIG. 2 is a photographic image showing an overhead view of the bag side of the carbon-containing composite material substrate shown in FIG. 1, and showing eight regions of the substrate surface having been laser-treated to varying levels;

FIG. 3 is a photographic image showing an overhead view of the tool side of the carbon-containing composite material substrate shown in FIG. 1, and showing eight regions of the substrate surface having been laser-treated to varying levels;

FIG. 4A is a histogram showing plotted results of gloss analyses of the carbon-containing composite material substrate surface (tool side) as shown in FIGS. 1 and 3 (and compared to analysis of untreated substrate surface/no laser passes);

FIG. 4B is a histogram showing plotted results of gloss analyses of the carbon-containing composite material substrate surface (bag side) as shown in FIGS. 1 and 2 (and compared to analysis of untreated substrate surface/no laser passes);

FIG. 4C is a histogram showing plotted results of gloss analyses of the carbon-containing composite material substrate surface (tool side) as shown in FIGS. 1 and 3 with gloss analyses conducted at 20 degrees, 60 degrees, and 85 degrees after varying number of laser passes (and compared to analysis of untreated substrate surface/no laser passes);

FIG. 4D is a histogram showing plotted results of gloss analyses of the carbon-containing composite material substrate surface (tool side) as shown in FIGS. 1 and 3 with gloss analyses as shown conducted at 85 degree average parallel to laser and perpendicular to laser (and compared to analysis of untreated substrate surface/no laser passes);

FIG. 4E is a histogram showing plotted results of gloss analyses of the carbon-containing composite material substrate surface (bag side) as shown in FIGS. 1 and 2 with gloss analyses conducted at 20 degrees, 60 degrees, and 85 degrees after varying number of laser passes (and compared to analysis of untreated substrate surface/no laser passes);

FIG. 4F shows two histograms showing a gloss analysis at 85 degree gloss of tool side analysis showing comparison between parallel alignment of gloss measurement instrument to the laser (first chart) and perpendicular alignment of gloss measurement instrument to the laser (second chart), with comparison of number of laser passes/level of laser treatment of composite material surface as compared to no laser treatment of composite material surface;

FIG. 5A is a histogram showing plotted results of tool side analysis of composite material substrate surface using FTIR (and compared to analysis of untreated substrate surface/no laser passes);

FIG. 5B is a histogram showing plotted results of bag side analysis of composite material substrate surface using FTIR (and compared to analysis of untreated substrate surface/no laser passes);

FIG. 6A is a plotted chart showing full spectra FTIR analysis of tool side surface of composite material substrate illustrating correlation of number of laser passes/level of laser treatment with decreasing FTIR peaks;

FIG. 6B is a plotted chart showing C—H bonding region spectra peaks of FTIR analysis of tool side surface of composite material substrate illustrating correlation of number of laser passes/level of laser treatment with decreasing FTIR peaks;

FIG. 6C is a surface profile histogram showing C—H bonding region spectra of FTIR analysis of tool side surface of composite material substrate illustrating correlation of number of laser passes/level of laser treatment with decreasing FTIR peaks;

FIG. 6D is a plotted chart showing carbonyl, benzene, and amino group "fingerprint" region spectra peaks of FTIR analysis of tool side surface of composite material substrate illustrating correlation of number of laser passes/level of laser treatment with decreasing FTIR peaks;

FIG. 6E is a plotted chart showing "fingerprint region of the benzene peak area (at wavelength between 1546 to 1483 $cm^{-1}$) of FTIR analysis of tool side surface of composite material substrate illustrating correlation of number of laser passes/level of laser treatment with decreasing FTIR peaks;

FIG. 6F is a FTIR peak area histogram plotting benzene region spectra (between 1546 to 1483 $cm^{-1}$) of FTIR analysis of tool side surface of composite material substrate illustrating correlation of number of laser passes/level of laser treatment with decreasing FTIR peaks (and compared to analysis of untreated substrate surface/no laser passes);

FIG. 6G is a plotted chart showing full spectra FTIR analysis of bag side surface of composite material substrate illustrating inverse relationship between FTIR signal and number of laser passes/laser surface treatment (and compared to analysis of untreated substrate surface/no laser passes);

FIG. 6H is a peak area histogram plotting amino region spectra (between 1628-1587 $cm^{-1}$) of FTIR analysis of bag side surface of composite material substrate illustrating correlation of number of laser passes/level of laser treatment with decreasing FTIR peaks (and compared to analysis of untreated substrate surface/no laser passes);

FIG. 7 is a histogram showing plotted results of tool side analysis of composite material substrate surface using colorimeter (and compared to analysis of untreated substrate surface/no laser passes) showing average L*, a*, b*, and ΔE* values;

FIGS. 8A, 8B, 8C, and 8D are histograms showing plotted results of tool side analysis of laser-treated composite material substrate surface using colorimeter (and compared to analysis of untreated substrate surface/no laser passes) showing average L*, a*, b*, and ΔE* values;

FIGS. 8E, 8F, 8G, and 8H are histograms showing plotted results of bag side analysis of laser-treated composite material substrate surface using colorimeter (and compared to analysis of untreated substrate surface/no laser passes) showing average L*, a*, b*, and ΔE* values;

FIG. 8I is a histogram showing plotted results of tool side analysis of laser-treated composite material substrate surface using colorimeter (and compared to analysis of untreated substrate surface/no laser passes) showing average L*, a*, b*, and ΔE* values;

FIG. 8J is a histogram showing plotted results of bag side analysis of laser-treated composite material substrate surface using colorimeter (and compared to analysis of untreated substrate surface/no laser passes) showing average L*, a*, b*, and ΔE* values;

FIG. 9A shows histograms with plotted results of tool side analyses of laser-treated composite material substrate surface using ballistic water contact angle testing (and compared to analysis of untreated substrate surface/no laser passes);

FIG. 9B shows histograms with plotted results of bag side analyses of laser-treated composite material substrate surface using ballistic water contact angle testing (and compared to analysis of untreated substrate surface/no laser passes);

FIG. 10A is an optical interferometer readout of a tool side of a carbon-containing composite material substrate with inconclusive results due to small sample size;

FIGS. 10B, 10C, 10D, 10E, 10F, 10G, 10H, and 10I are optical interferometer readouts of a tool side of a laser-treated carbon-containing composite material substrate showing results from varying number of laser passes (1, 2, 3, 4, 6, 8, 12, and 16 laser passes respectively);

FIG. 11A is a chart representing the surface profile of a tool side of a laser-treated carbon-containing composite material surface measuring surface roughness using optical interferometry (and compared to analysis of untreated substrate surface/no laser passes);

FIG. 11B shows surface profile histograms plotting results of tool side analysis of a representative laser-treated carbon-containing composite material with peak area plotted versus number of laser (ablation) treatment passes (and compared to analysis of untreated substrate surface/no laser passes);

FIG. 12A is a bar chart showing plotted values showing measured surface resistivity (using an aluminum square probe) plotted against varying number of laser passes (and compared to analysis of untreated substrate surface/no laser passes);

FIG. 12B is a bar chart showing plotted values showing measured surface resistivity (using a copper strip probe) plotted against varying number of laser passes (and compared to analysis of untreated substrate surface/no laser passes);

FIG. 12C is a bar chart showing plotted values showing measured surface resistivity at two settings ((20 lb Ohms/sq. and 40 lb Ohms/sq.) plotted against varying number of laser passes (and compared to analysis of untreated substrate surface/no laser passes);

FIG. 13 is a chart showing measured optically stimulated electron emission values of tool side and bag side of laser-treated carbon-containing composite material substrate surfaces over varying (increasing) number of laser passes (and compared to analysis of untreated substrate surface/no laser passes).

Figure 14:
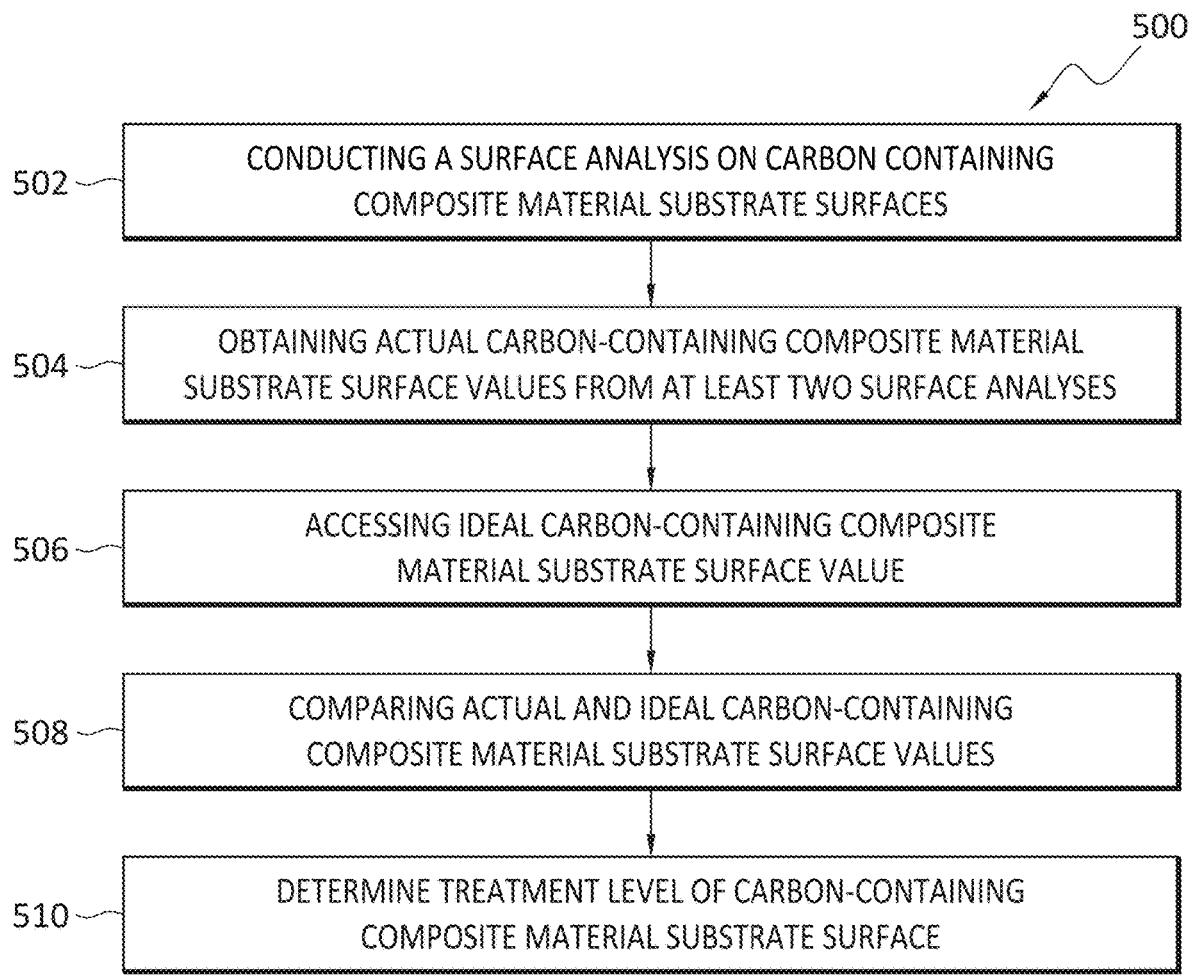
Figure 15:
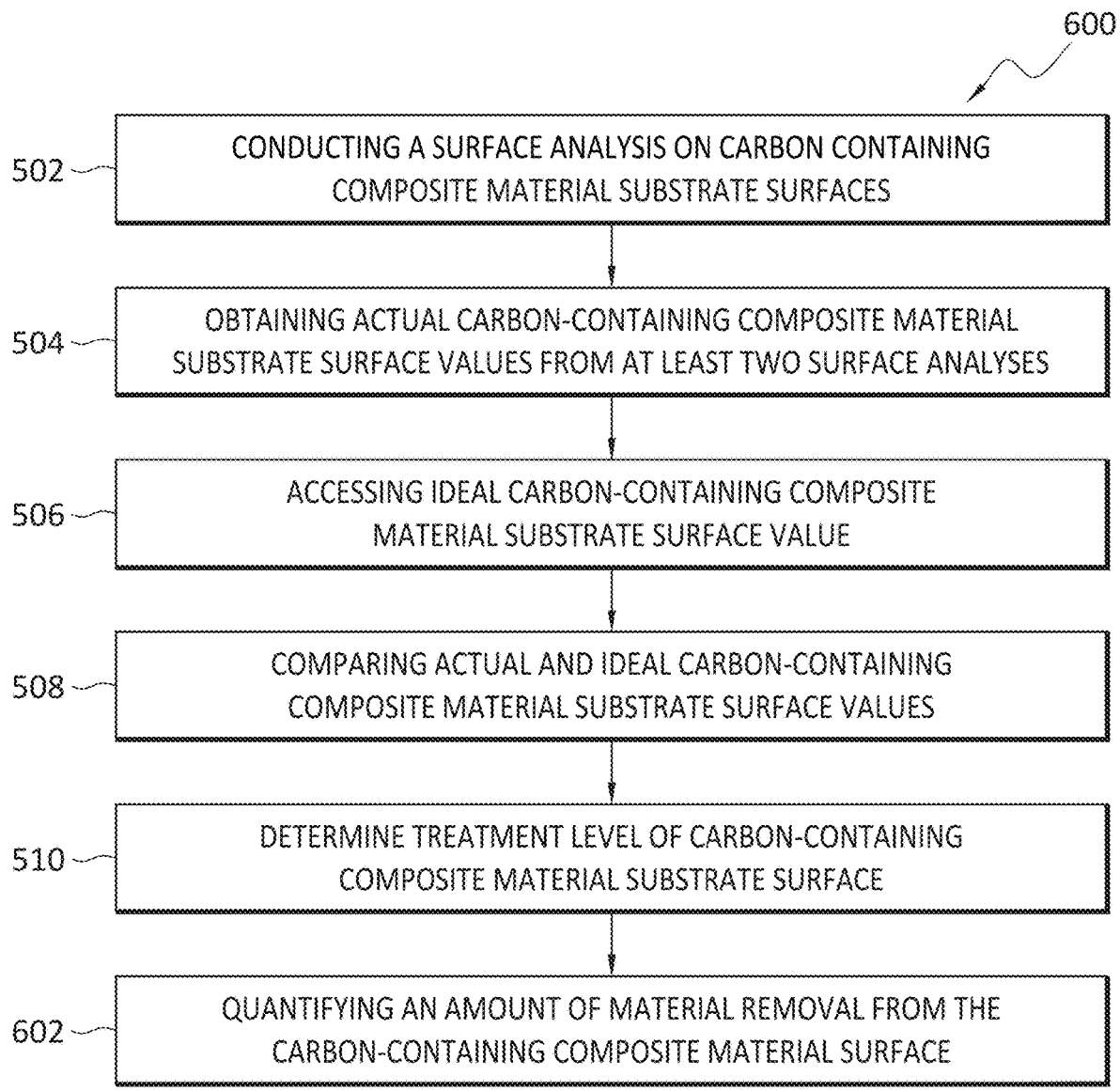
Figure 16:
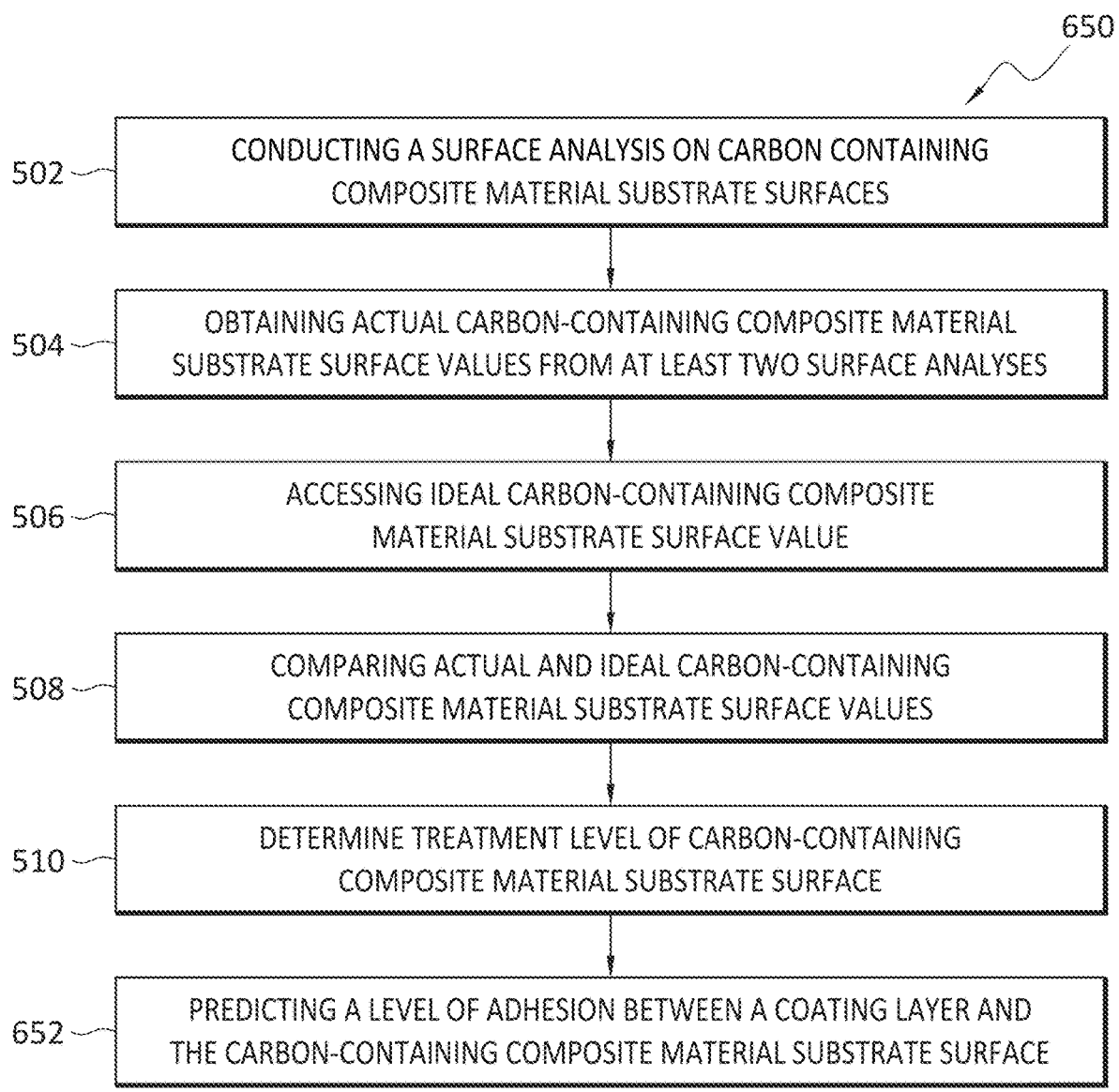
Figure 17:
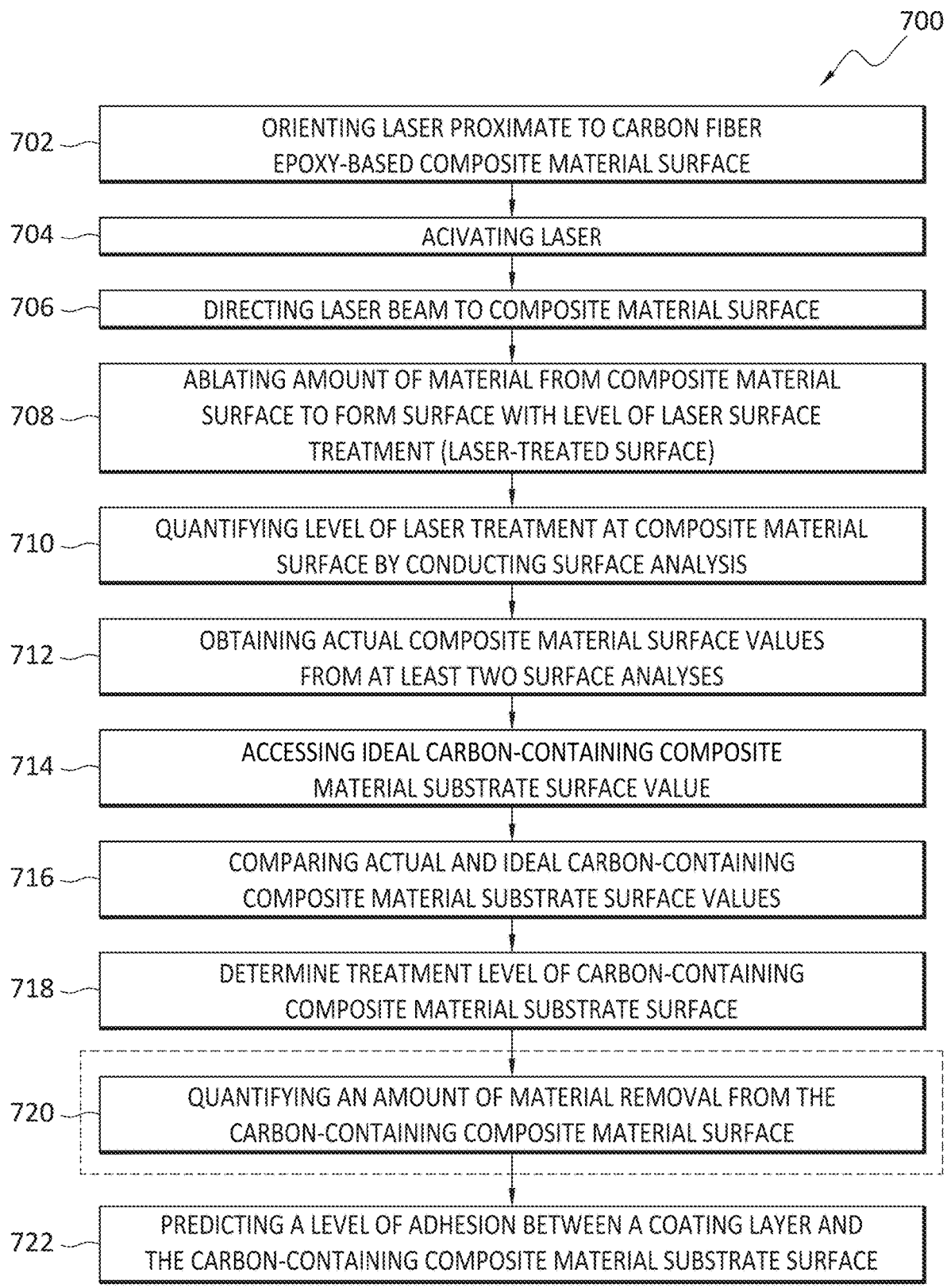

FIG. 14 is a flowchart outlining a method according to present aspects;

FIG. 15 is a flowchart outlining a method according to present aspects;

FIG. 16 is a flowchart outlining a method according to present aspects;

FIG. 17 is a flowchart outlining a method according to present aspects; and

Figure 18:
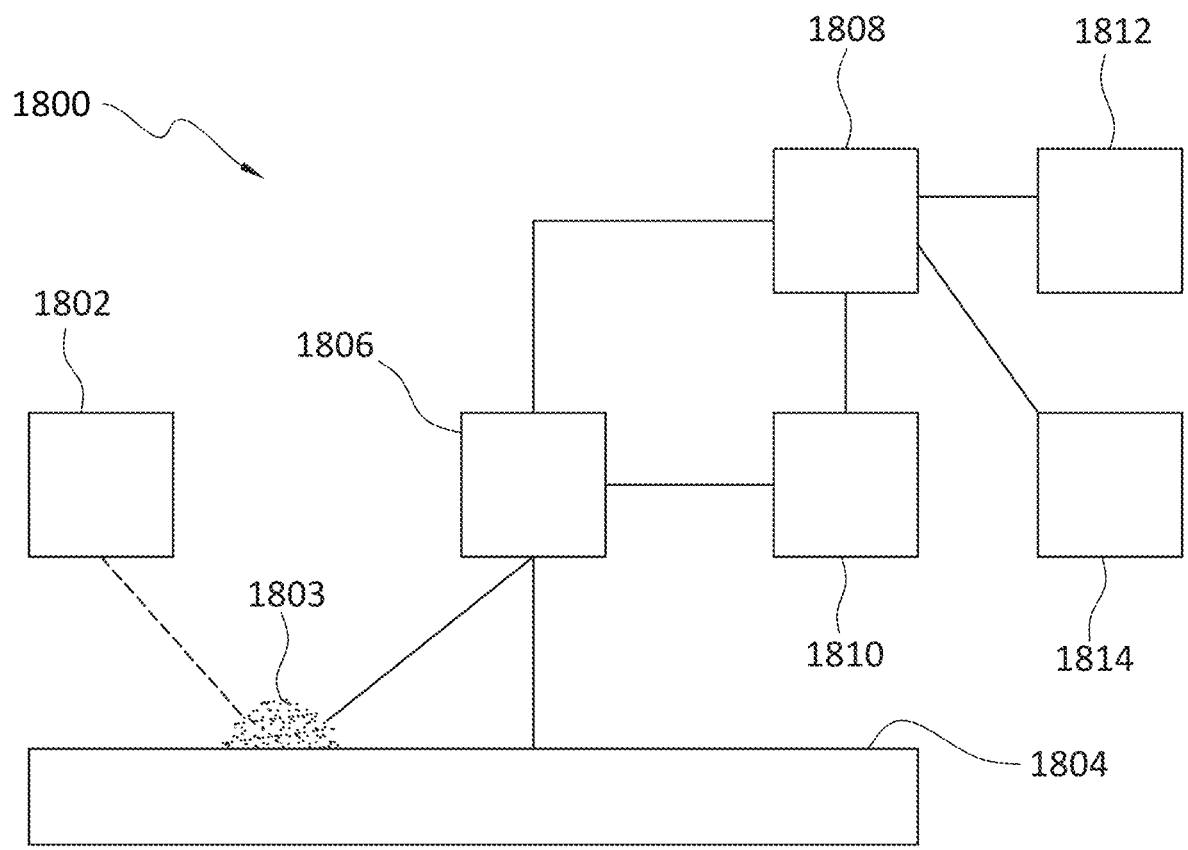

FIG. 18 is a representative block diagram of the presently disclosed systems according to present aspects.

DETAILED DESCRIPTION

Aspects of the present disclosure are directed to the use of at least one methodology or technique, for the purpose of at least one of either: 1) determining that a desired and predetermined level or "degree" of surface treatment of a composite substrate surface has or has not been conducted (e.g., laser treatment of a composite substrate surface); and/or 2) that a composite substrate surface has been laser treated at all, or has been laser treated to a predetermined level, or "degree". According to present aspects, an actual surface treatment value of a substrate material is determined using at least one of the following investigative techniques: gloss, Fourier Transform Infrared spectroscopy (referred to equivalently herein as "FTIR"), color, ballistic water contact angle (referred to equivalently herein as "BWCA), surface resistivity and optical Interferometry Surface Profiling and Optically Stimulate Electron Emission (equivalently referred to herein as "OSEE"). The listed investigative methodologies and systems, according to present aspects, can be used as quality assurance or quality control methodologies and/or systems and can be implemented as "spot check" quality control tools, or can be integrated into composite material substrate surface laser-treating processes for real-time evaluation of the laser-treated composite material substrate surfaces.

The actual surface treatment value obtained according to present aspects can represent the level of surface treatment that a substrate surface has or has not sustained. The determined actual surface treatment value is then compared to an ideal surface treatment value that is known (referred to equivalently herein as a "surface treatment standard") to determine whether or not the surface under examination has been treated to an adequate level, or degree, and will exhibit a desired and predetermined surface characteristic (e.g., a surface roughness to facilitate coating adhesion, etc.) such that, if desired, the substrate can undergo successful and predetermined further processing.

Further present aspects contemplate the presently disclosed substrate surface investigative tools being integrated into laser treatment process and systems for the purposes of controlling the laser treatment systems and methods, as feedback on the adequacy of the laser treatments can be fed back to the laser surface treatment systems in real time.

Substrate material surfaces, including composite material substrate surfaces, are often conditioned or treated to facilitate subsequent treatments or otherwise render composite material substrate surfaces to a state or condition that is conducive for further processing. For example, composite material substrate surfaces used as components in larger assemblies and sub-assemblies (e.g., aircraft wings, tails, fuselages, etc.) have surface treatments for purposes of increasing the adhesion values of such surfaces that must accept subsequent coating or paint layers, etc.

According to present aspects, methods and systems are disclosed for using a surface analysis tool to quantitatively detect the presence of and the level of laser treatment that has or has not occurred on a composite material substrate surface under investigation, with the laser treatment being detected including, for example, ablative laser treatment.

By implementing present aspects, methods are achieved for ensuring that a composite material substrate surface has been adequately treated, for example, adequately laser treated, such that further processing can be conducted; such as, for example, bonding processes of further materials, or adhesion of added coatings, paints, primers, etc.

Laser treatment of composite material substrate surfaces, as opposed to treating large composite material substrate surfaces by hand would yield significant benefits in terms of reproducible quality, ergonomic benefits and safety, reduction in flow time (e.g., reduction in component manufacturing time, etc.) etc. Aspects of the present disclosure are directed to inspection and verification techniques for determining the presence of a laser treated composite material substrate surface, and for determining that the level or degree of laser treatment of composite material substrate surfaces meets a predetermined value or condition represented by a particular value, where the value is achieved by performing at least one investigative technique that can be conducted as a "spot check" for purposes of quality control before further processing.

Alternatively, according to present aspects, inspection, and verification techniques for determining the presence of a laser treated composite material substrate surface, and for determining that the level or degree of laser treatment of composite material substrate surfaces meets a predetermined value or condition represented by a particular value can be implemented in a processing line, for example, as a composite material substrate surface is conditioned or surface-treated, where such conditioning or surface-treating includes, for example, laser surface treatment of the composite material substrate surface.

According to present aspects, the disclosed methods and systems confirm, with a high degree of accuracy, how a substrate material will perform during subsequent processing. According to further aspects, the determination of the level of treatment can be done quantitatively and in real time; and can further provide a map of an entire substrate, can provide information "in-line" during manufacture, and/or can "spot check" regions over a substrate surface in a post-manufacture inspection process.

Fourier-transform infrared spectroscopy (FTIR) is a technique used to obtain an infrared spectrum of absorption or emission of a solid, liquid or gas. An FTIR spectrometer simultaneously collects high-spectral-resolution data over a wide spectral range.

Optical profiling uses interference microscopes, that are used to measure height variations (that can, for example, translate into surface roughness) on surfaces with great precision using the wavelength of light as the ruler. Further, optical profiling uses the wave properties of light to compare the optical path difference between a test surface and a reference surface, or standard. Inside an optical interference profiler, a light beam is split, reflecting half the beam from a test material which is passed through the focal plane of a microscope objective, and the other half of the split beam is reflected from a reference mirror.

When the distance from the beam splitter to the reference mirror is the same distance as the beam splitter is from the test surface and the split beams are recombined, constructive and destructive interference occurs in the combined beam wherever the length of the light beams vary. This creates the light and dark bands known as interference fringes. Since the reference mirror is of a known flatness (that is, it is as close to perfect flatness as possible), the optical path differences are due to height variances in the test surface. The interference beam is focused into a digital camera, which sees the constructive interference areas as lighter, and the destructive interference areas as darker. In the interference images herein (e.g., "interferograms"), each transition from light to dark represents one-half a wavelength of difference between the reference path and the test path. If the wavelength is known, it is possible to calculate height differences across a surface, in fractions of a wave. From these height differences, a surface measurement that can be in the form of a surface measurement is obtained.

OSEE offers several important advantages over existing laboratory methods with similar sensitivity, e.g., spectroscopy and nonvolatile residue sampling, which provide turn-around time, real time capability, and full coverage inspection capability. Laboratory methods required sample gathering and in-lab analysis, which sometimes takes several days to get results. This is not practical in a production environment. In contrast to present aspects, former OSEE methods could not offer full coverage inspection of the large components.

According to present aspects, the OSEE methodology utilizes the photo-electric effect. The OSEE sensor contains an ultraviolet (UV) bulb which, when directed onto a surface, causes electrons to be emitted from the surface. The freed electrons are attracted to a positively charged collector ring in the sensor that is attached to a direct current (DC) battery. The resulting electron current is displayed on the instrument readout and collected by a data acquisition system. If a contaminant exists on the surface, the UV radiation that reaches the steel is reduced, which in turn reduces the current.

According to present aspects, baseline OSEE values were determined by using the instrument to inspect a surface chemistry stable chromium standard (chrome vapor deposited on glass). Due to the nature of the chromium standard, stainless steel calibration transfer standards were used to transfer the baseline value to steel for on-line calibration. A standard instrument was set up and calibrated to the baseline and was then maintained in a clean room to reduce the risk of instrument drift. For production calibration, a clean transfer standard was inspected with the control instrument, a value was derived from the inspection for that standard, and the printout of that value was attached to the canister that contained the panel. The standard was placed in a sealed canister and taken to the production line. A reading was taken on the panel and adjusted the electrical gain on the line instrument to obtain the value on the printout attached to the standard. A "properly cleaned transfer standard" was one that underwent a tightly controlled cleaning process using laboratory grade solvents and cleaners. Properly cleaned standards had an acceptable OSEE value that was tracked in a database. Transfer standards, as well as verification with several backup comb-01 instruments, constituted the process to ensure that the baseline for calibration did not drift, With electronic calibration, the W bulb energy was measured and adjusted to a set point for each instrument and compensation was made for bulb differences and aging. Electronic calibration includes connecting a 100 gigohm resistor to the OSEE collector which simulates the signal current. The gain was then adjusted to a defined set point. The mercury arc lamp used in the OSEE instrument emits spectrum at 254 nanometers (nm), 185 nm, and several spectral lines between 297 nm, and 313 nm. The 254 nm spectral line emits 95 percent of the energy from the mercury arc lamp and in theory much of the 185 nm energy is absorbed by air, so it had been assumed that the OSEE signal was due to the 254 nm spectral line.

As shown in FIG. 1, the entireties of which are incorporated by reference herein as if made a part of the present specification, a composite material substrate test panel was constructed and subjected to testing methodologies including: gloss, Fourier Transform Infrared spectroscopy (referred to equivalently herein as "FTIR"), color, ballistic water contact angle (referred to equivalently herein as "BWCA), surface resistivity and optical Interferometry Surface Profiling and Optically Stimulate Electron Emission (equivalently referred to herein as "OSEE"). As shown in FIG. 1, a composite material substrate test panel 10 was constructed with the composite material substrate test panel 10 including a carbon fiber-containing woven fabric outer ply layer on the first side 13 representing a tool side composite material and including a carbon-containing woven fabric outer ply layer on the second side 14 representing a "bag side" of the composite material substrate test panel. "Tool side" refers to the (first) side of the composite material substrate that is in contact with a molding tool. The first surface 13a of the composite material that contacts a molding tool is typically where an outer mold line (OML) typically would be formed. When a curing protocol uses a bag curing under heat and vacuum to cure a molded composite material on a mold, the term "bag side" refers to the (second) side of the composite material substrate that is in contact with a vacuum "bag" during curing. The second surface 14a of the composite material that contacts a vacuum bag is typically where an inner mold line (IML) typically would be formed. As further shown in FIG. 1, a plurality of inner plies 12 made from carbon fiber-containing composite material prepreg plies are shown interposed between the carbon fiber-containing woven fabric outer ply layer on the first side 13a (that can correspond to the tool side) and the carbon-containing woven fabric outer ply layer on the second side 14a (that can correspond to the bag side) to form the carbon-containing composite material substrate test panel 16.

FIG. 2 is a photographic image showing an overhead view of the bag side of the carbon-containing composite material substrate 20 (shown in FIG. 1 as 16), and showing eight regions 24 of the substrate surface having been laser-treated to varying levels.

FIG. 3 is a photographic image showing an overhead view of the tool side of the carbon-containing composite material substrate 20 (shown in FIG. 1 as 16), and showing eight regions 23a of the substrate surface having been laser-treated to varying levels.

Example 1

Laser Surface Treatment

A 55 W AVIA UV laser was used to treat the composite material substrate test panel surfaces. Eight 2.5 inch (in)×2.5 in (6.35 centimeter (cm)×6.35 cm) squares were distributed on the 12 in×7 in (30.48 cm×17.78 cm) panel. Each of the eight squared sustained laser passes numbering 1, 2, 3, 4, 6, 8, 12, and 16 passes of the laser beam over the respective test square (e.g., the eight regions on the first surface 13a (tool side), and the 8 regions of the second surface 14a (bag side)). Panels were solvent wiped on both sides prior to surface preparation using wipes that met the requirements of AMS 3819B Class 2 Grade A. The laser was rastered parallel to the width of the test panel. For the tool side (13a), laser surface treatment was performed on each square individually before moving to the next. As a result, the laser surface treatment had a gradation moving across each square. This was visually observable. For the bag side, one pass was performed on all 8 squares followed by another pass on 7 squares, and so on. The order of the treatment of the bag side squares was not sequential.

Composite material substrate surfaces, with and without laser treatment, were characterized to determine if various levels of laser surface treatment could be detected.

Example 2

Gloss Testing

Gloss values at 20, 60, and 85 degree illumination angle geometries were collected using a BYK Gardner micro-TRI-gloss micro Model 4435 Gloss meter. Gloss of laser treated surfaces, as average values, are shown in FIG. 4C, for tool side surfaces, and at FIG. 4E for bag side surfaces. Gloss measured at 85 degrees was shown to be a better angle of detection for measuring matte, or dull surfaces, and was determined to have a better correlation to laser passes as compared to 20 degree and 60 degree angles of detection. For tool side treatment, average gloss at 85 degrees was successful at detecting presence of laser treatment and number of passes with some overlapping error bars, For bag side surfaces, the average gloss at 85 degrees detected level of surface treatment. Due to high standard deviation in average gloss values, the individual maximum gloss values were plotted. Gloss, 85 degree individual max, showed good correlation to level of laser treatment (e.g., ablation). Accordingly gloss was determined to detect presence of laser treatment and level of laser surface treatment.

Example 3

Fourier Transform Infrared Spectroscopy (FTIR) Testing

Chemical information was gathered using FTIR spectroscopy with an Agilent Model 4100 "Exoscan" spectrometer, gain of 243, 64 scan, 8 cm-1 wavenumber resolution between 650 and 4000 wavenumbers and a diffuse reflectance attachment A 100 mm diffuse reference standard was used. The instrument was rotated for each measurement eliminate any effects of fiber orientation on results. All spectra are shown on a common scale. OMNIC 8.2.0.287 software from ThermoScientific was used for spectral analysis. FTIR spectra collected on the tool side and bag side surfaces are shown in FIG. 6A. For tool side surfaces, laser treatment followed the expected trend that the FTIR peaks decreased with number of laser passes. See FIG. 6A. This reduction in signal is likely due to removal of the epoxy resin with laser ablation. For the bag side surfaces however, the signal increased with laser passes. See FIG. 6G and FIG. 6H. The FTIR instrument detector may have had better contact with the surface with increased laser passes, causing the high the signal strength.

A spectral math difference was performed to determine which peaks were good candidates to use for process control with laser passes. Laser passes appeared to remove a small amount of resin material overall. There was no indication that laser ablation was selective for any one chemical bond or caused a shift in the resin chemistry. The C—H bonding region of FTIR spectra was selected because it was thought to capture the removal of the overall organic epoxy resin with multiple C—H bonds. The C—H bonding peak between 3016-2785 cm$^{-1}$ was also used in previous work on sanded composite surfaces and correlated well with level of surface abrasion. The C—H bonding peak between 3016-2785 cm$^{-1}$ was analyzed and the peak area quantified for both tool side and bag side laser treated surfaces. See FIG. 6B. Peak area versus laser passes is shown in FIG. 6C for a tool side.

It was determined that the C—H bonding peak is not a good candidate for process control of tool side laser treated surfaces, which is different from what was observed with respect to sanded composite surfaces. The error bars were overlapping and there was not a robust correlation. FTIR peak areas after 2 and 3 laser passes were abnormally high for bag side and low for tool side. While being bound to no single theory, the different FTIR signal with 2 and 3 passes could possibly be due to redeposition of ablated resin that either enhances or blocks the FTIR signal. Another theory is that when the laser eventually contacts the fibers after 2 passes the ablative process is more "explosive" causing the resin to disperse rather than ablate away until it reaches a threshold of resin removal point after 4 passes. It could also be an anomaly in the laser treatment. If that is the case, the results support the ability of FTIR to detect out of process conditions. Because the C—H bonding peak did not have a robust correlation, other peaks in the fingerprint region of the FTIR spectra were investigated. For tool side surfaces the benzene peak (1546-1483 cm$^{-1}$) (see FIG. 6D) showed good correlation to laser passes (see FIG. 6F). For bag side surfaces the amino FTIR peak (1628-1587 cm$^{-1}$), likely from the amine curative in the epoxy resin, showed good correlation to laser passes (see FIG. 6H). The handheld, portable FTIR Exoscan instrument can be tuned and calibrated to be a "go/no go" tool for identification of laser treatment using these peaks or using a chemometrics model based on set of calibrations standards. Regardless of the exact method, this work proves that FTIR can be used for detection of presence and level of treatment on tool side and bag side surfaces.

Example 4

Color

Color was measured with a BYK Gardner spectro-guide 45/0 gloss Model CC-6801 which uses a 45° circumferential illumination and 0° viewing perpendicular to the sample plane. Results were reported using a Commission Internationale de l'Elcairage (CIE) Lab color coordinate system. Color measurements were collected at 9 locations on each square except in the case where there was very little variation and the number was reduced. Locations of color measurements on 2.5 in×2.5 in (6.35 cm×6.35 cm) surface treated areas were observed.

L*, a*, b*, and E* values were calculated for tool side and for bag side of the composite panel after various numbers of laser passes. The overwhelming strong signal for both tool side and bag side surfaces were the L* color value. The L* value represents the gray scale in the CIE color coordinate system. Examples of abraded and unabraded composite substrates are shown on the color coordinate system diagram to demonstrate their effect on the L* value gray scale value. The strong L* signal carried over to strong E* values based on Equation 1. E* captures the differences in the a* and b* values in addition to L*. The L* or E* value are good candidates for "go-no go" process control because they differentiate between treated and untreated surfaces.

All color values, L*, a*, and b*, were investigated further for tool side and for bag side surfaces. The a* value averages were different between treated and untreated but the error bars overlapped. The b* value was able to distinguish between treated and untreated surfaces on bag side surfaces only. The b* values had a correlation to number of passes, but the differences were not significant enough for process control for tool side surfaces. This increasing trend in the b* values suggests a shift from blue to yellow with increasing laser passes. While not being bound to any particular theory, this result could be due to exposure of fibers after laser treatment or a color shift in the resin system itself with exposure to 355 nm laser. As a result, it is recommended to use L* or E* for process control which has now been shown to successfully differentiate between treated and untreated. Further work could be done to determine if b* could be utilized to detect number of passes. ΔE*, ΔL*, Δa*, and Δb* values were investigated as well but they did not appear to show a strong correlation to presence of laser treatment or number of passes.

Example 5

Ballistic Water Contact Angle (BWCA)

Water contact angle was calculated by the instrument based on the deposition area of a ballistically placed water droplet of known volume. The calculated water contact angle was then used to infer surface energy. This is based on Young's equation which correlates the contact angle to surface energy. Since water was used, the surface energy is based on the polar (water) component only. A higher BWCA value (smaller deposition area) is an indication of a lower energy, less active surface. A lower BWCA value (larger deposition area) is an indication of a higher energy, more active surface. Approximately 6-7 contact angle measurements were collected on each of the laser treated squares distributed somewhat evenly over the treated area.

BWCA was measured on the panels in less than 4 hours after laser surface treatment. Results are shown in FIG. 9A for tool side and FIG. 9B for bag side surfaces. BWCA was successful at detecting the difference between treated and untreated surfaces as well as the level of treatment except in the case of high levels of treatment at 6, 10, 12, and 16 passes. This was shown with the average, minimum and maximum. For bag side surfaces the contact angle decreased and the inferred surface energy increased with number of laser passes. However for tool side surfaces the contact angle increased indicating that the inferred surface energy decreased with number of laser passes. This is not an expected result after surface treatment. While not being bound to any particular theory, it is believed that the change in the surface energy could potentially be due to the change in morphology of the surface as the laser ablated away either the resin leaving an increased number of exposed fibers (tool side) or smoothed resin surface morphology as it ablated away the resin (bag side). More information could be gathered from collecting information using a non-polar fluid perhaps with the Kruss handheld instrument. For bag side surfaces, the instrument had difficulty detecting the outline of the droplets. Approximately ⅓ of the droplets had to be remeasured. Newer models of the Surface Analyst can be tuned to differentiate the droplet outline from the substrate background. Overall BWCA is a viable method for process control. The drawbacks are that it leaves a water droplet on the surface and it is only a spot check. However, it is a handheld tool that provides real time information with minimal post signal processing.

Example 6

Surface Resistivity

Surface resistivity was measured using two different surface probes, a copper foil hand-held probe with 2.5 in×0.2 in (6.35 cm×0.51 cm) area between strips (0.5 sq. in (3.23 sq. cm)) and an aluminum probe with 1 sq. in. (6.45 sq. cm) area between the contact surfaces. Resistance was measured using a Megger MiT 485 tester. The results appeared highly variable; likely due to the variable hand pressure method. However it was obvious that surface resistivity could easily distinguish between a treated and untreated surface. To try to reduce the variability, a controlled weight method was tested using two different weight levels, 20 pounds (lb.) (9.07 kilograms (kg)) and 40 lb] (18.41 kg), on the probe. Results were less variable and demonstrated the "go/no go" capability particularly at the 20 lb level. However, even with the controlled pressure surface resistivity was still not able to detect levels of laser treatment. Surface resistivity is a good candidate for a "go/no go" process check method on tool side surfaces. Surface resistivity was demonstrated to be a superior "go/no go" tool for detecting laser treatment if the surface had been laser treated on tool side surfaces. However, surface resistivity did not appear to be capable of measuring levels of laser treatment on bag side surfaces. The resistivity meter did not detect a signal even on the 16 pass laser ablated area on the bag side surface.

Example 7

Optical Interferometry Surface Profiling

Surface profile data collected with the Bruker white light optical interferometer was very successful at differentiating between ablated and non-ablated clearly on tool side surfaces. A histogram of the depth data versus data points, sorted into 500 bins, is shown in FIG. 11A. The curves between treated and untreated surfaces are distinct from one another. Two "buckets" of surface profile data were becoming apparent after 12 and 16 laser passes. This is shown in a flattening of the histogram plot at 12 and 16 passes. It was assumed that one bucket is the surface profile of the resin rich areas and the other is the surface profile of the fiber rich areas. With subsequent laser ablation the fibers are more exposed causing the flattening of the curve. Peak area (see FIG. 11B) and peak height of the histogram data were plotted versus laser passes. There is a clear go/no go threshold limit with surface profilometry using the optical interferometer. The number of passes is also apparent. The optical profilometer was not able to capture information about laser ablation on bag side surfaces due to the inability of the light to get to the laser ablated surfaces. There was less than 70% collection rate generally.

On tool side surfaces optical interferometer provided information about both the resin rich areas as well as the fibers on topside surfaces. The resin rich areas were affected most clearly by the laser ablation indentations. The fiber rich areas had a profile change as they became exposed during the ablation process (see FIG. 10A). To capture both effects the area of assessment was increased, and images stitched together.

Example 8

Optically Stimulated Electron Emission (OSEE)

OSEE analysis was performed with a 1 in (2.54 cm) diameter detector instrument. OSEE was developed and patented by NASA (U.S. Pat. No. 5,393,980). Preliminary spot checking of OSEE with the NASA LaRC instrument on a laser treated composite material substrate surface test panel was successful at detecting presence of laser treatment. The tests were conducted on unidirectional Torayca P2302-19 (T800H/3900-2) prepreg. While not being bound to any particular theory, it was thought that contamination was interfering with measurements of the composite panel, possibly requiring further solvent washing and remeasurement. OSEE is a tool that has been shown to be very sensitive to presence of contaminants and/or out time. Accordingly, OSEE would be best suited for measuring the surfaces immediately after treatment.

Method

FIG. 14 is a block diagram outlining a method according to a present aspect. As shown in FIG. 14, a method 500 is disclosed for inspecting and determining the presence of laser treatment on a carbon-containing composite material surface, and/or determining the level or degree to which the carbon-containing composite material substrate surface has been laser treated. According to presents aspects, the method 500 includes conducting 502 a surface analysis on a carbon-containing composite material surface, with surface analysis selected from at least one of: gloss analysis, Fourier transform infrared spectroscopy, color analysis, contact angle analysis, surface resistivity, optical interferometry, and optically stimulated electron emission, and obtaining 504 actual carbon-containing composite material surface values from the surface analysis performed on the carbon fiber epoxy-based composite material surface.

In another aspect, the method further includes accessing 506, for example, accessing information or values from a memory that includes an ideal carbon-containing composite material surface value, and comparing 508 the actual carbon-containing composite material surface values to the ideal carbon fiber epoxy-based composite material surface value.

In a further aspect, the method further includes determining 510 a laser treatment level of the carbon-containing composite material surface.

In another aspect, a method 600 is shown in FIG. 15 that further includes quantifying 602 an amount of material removal from the carbon-containing composite material surface.

In a further aspect a method 650 is disclosed herein and presented in FIG. 16, the method further including predicting 652 an adhesion level of a coating layer to the carbon-containing composite material surface.

In a further aspect, the method further includes predicting an adhesion level of the carbon-containing composite material surface.

In another aspect, the carbon-containing composite material surface includes a carbon fiber epoxy-based composite material.

According to further present aspects, a method 700 is disclosed herein and presented in FIG. 17 for inspecting and determining the presence of laser treatment on a carbon-containing composite material surface, and/or determining the level or degree to which the carbon-containing composite material substrate surface has been laser treated. The method includes orienting 702 a laser proximate to a carbon fiber epoxy-based composite material surface, activating 704 the laser to produce a laser beam, directing 706 the laser beam from the laser to the carbon fiber epoxy-based composite material surface. The method further includes ablating 708 an amount of material from the carbon fiber epoxy-based composite material surface to form a carbon fiber epoxy-based composite material surface comprising a level of laser treatment, quantifying 710 the level of ablative surface treatment of the carbon fiber epoxy-based composite material surface by conducting a surface analysis on a carbon fiber epoxy-based composite material surface, with the surface analysis selected from at least one of: gloss analysis, Fourier transform infrared spectroscopy, color analysis, contact angle analysis, surface resistivity, optical interferometry, and optically stimulated electron emission. The method further includes obtaining 712 actual carbon fiber epoxy-based composite material surface values resulting from the surface analysis performed on the carbon fiber epoxy-based composite material surface.

In another aspect, the method shown in FIG. 17 includes accessing 714 an ideal carbon fiber epoxy-based composite material surface value, for example, from a memory, and comparing 716 the actual carbon fiber epoxy-based composite material surface values to the ideal carbon fiber epoxy-based composite material surface value.

In another aspect, the method further shown in FIG. 17 includes determining 718 a laser-treatment level of the carbon fiber epoxy-based composite material surface.

In another aspect, the method shown in FIG. 17 further includes quantifying 720 an amount of material removal from the laser-treated carbon fiber epoxy-based composite material surface.

In another aspect, the method shown in FIG. 17 further includes predicting 722 an adhesion characteristic of the laser-treated carbon fiber epoxy-based composite material surface.

In another aspect, as shown in FIG. 18, present aspects are directed to a system that can be used to perform methods and examples disclosed herein. For example, the system 1800 is configured to perform the methods shown at least in FIGS. 14, 15, 16, and 17.

As shown in FIG. 18, the system 1800 includes a laser 1802 configured to remove an amount of material 1803 from a carbon fiber epoxy-based composite material surface 1804. The system 1800 further has at least one surface analyzer 1806 configured to perform at least one surface analysis including at least one of: gloss analysis, Fourier transform infrared spectroscopy analysis, color analysis, contact angle analysis, surface resistivity analysis, optical interferometry analysis, and optically stimulated electron emission analysis. The surface analyzer 1806 is configured to generate a signal corresponding to at least one surface analysis of the carbon fiber epoxy-based composite material surface 1804, with the surface analysis comprising at least one of: gloss analysis, Fourier transform infrared spectroscopy analysis, color analysis, contact angle analysis, surface resistivity analysis, optical interferometry analysis, and optically stimulated electron emission analysis.

As further shown in FIG. 18, the system 1800 includes a processor 1808 in communication with the surface analyzer 1806. In one example, the processor 1808 is in the surface analyzer 1806. In another example, the processor 1808 is in a computer connected to the surface analyzer 1806. The system 1800 further includes a display 1810 for reading an output value generated by the processor 1808. For example, the display 1810 is in communication with the processor 1808 and is connected to or part of the surface analyzer 1806. Additionally, the system 1800 has a memory 1812 with a memory value corresponding to an ideal laser-treated carbon fiber epoxy-based composite material surface characteristic value. The memory 1812 is configured to be accessed by the processor 1808. The system 1800 further has software 1814 in communication with the processor 1808. For example, the software 1814 is stored in the 1812 for access and execution by the processor 1808. The software 1814 is configured to compare the ideal laser-treated carbon fiber epoxy-based composite material surface characteristic value to the signal corresponding to the at least one surface analysis of the carbon fiber epoxy-based composite material surface 1804. The surface analyzer 1806 and/or the processor 1808 are configured to perform at least the methods shown in FIGS. 14, 15, 16, and/or 17.

In another aspect, as shown in FIG. 18, the system 1800 can be a system for inspecting the laser-treated carbon fiber epoxy-based composite material surface 1804. In such an aspect, the system 1800 includes at least one surface analyzer 1806 configured to perform a surface analysis comprising at least one of: gloss analysis, Fourier transform infrared spectroscopy analysis, color analysis, contact angle analysis, surface resistivity analysis, optical interferometry analysis, and optically stimulated electron emission analysis. The at least one surface analyzer 1806 is configured to generate a signal corresponding to at least one surface analysis of the carbon fiber epoxy-based composite material surface 1804, with the surface analysis selected from the group consisting of: gloss analysis, Fourier transform infrared spectroscopy analysis, color analysis, contact angle analysis, surface resistivity analysis, optical interferometry analysis, and optically stimulated electron emission analysis.

In this aspect, the system 1800 further includes a processor 1808 in communication with the surface analyzer 1806 and a memory 1812 having a memory value corresponding to an ideal laser-treated carbon fiber epoxy-based composite material surface characteristic value. The memory 1812 is configured to be accessed by the processor 1806. Software 1814 is in communication with the processor 1806 and is configured to compare the ideal laser-treated carbon fiber epoxy-based composite material surface characteristic value to the signal corresponding to at least one surface analysis of the carbon fiber epoxy-based composite material surface. A display 1810 reads an output value generated by the processor 1808. In this aspect, the surface analyzer 1806 and/or the processor 1808 are configured to perform at least the methods shown in FIGS. 14, 15, 16, and/or 17.

The present aspects may, of course, be carried out in other ways than those specifically set forth herein without departing from essential characteristics of the disclosure. The present aspects are to be considered in all respects as illustrative and not restrictive, and all changes coming within the meaning and equivalency range of the appended enumerated claims are intended to be embraced therein.

What is claimed is:

1. A method for determining a treatment level of a carbon fiber epoxy-based composite material surface, the method comprising:

conducting at least one surface analysis on the carbon fiber epoxy-based composite material surface, said surface analysis comprising at least one of: gloss analysis, Fourier transform infrared spectroscopy, color analysis, contact angle analysis, surface resistivity, optical interferometry, and optically stimulated electron emission;

obtaining an actual carbon fiber epoxy-based composite material surface value from the at least one surface analysis performed on the carbon fiber epoxy-based composite material surface;

accessing a carbon fiber epoxy-based composite material surface treatment standard value;

comparing in real time the actual carbon fiber epoxy-based composite material surface value to the carbon fiber epoxy-based composite material surface treatment standard value; and determining in real time a treatment level of the carbon fiber epoxy-based composite material surface based upon comparing the obtained actual carbon fiber epoxy-based composite material surface value to the carbon fiber epoxy-based composite material surface treatment standard value.

2. The method of claim 1, further comprising:

quantifying an amount of material removal from the carbon fiber epoxy-based composite material surface.

3. The method of claim 1, further comprising:

predicting an adhesion level of the carbon fiber epoxy-based composite material surface.

4. A method for determining a treatment level of a carbon fiber epoxy-based composite material surface, the method comprising:

orienting a laser proximate to the carbon fiber epoxy-based composite material surface;

activating the laser to produce a laser beam;

directing the laser beam from the laser to the carbon fiber epoxy-based composite material surface;

ablating an amount of material from the carbon fiber epoxy-based composite material surface to form a degree of ablative surface treatment on the carbon fiber epoxy-based composite material surface;

quantifying the degree of ablative surface treatment of the carbon fiber epoxy-based composite material surface by conducting at least one surface analysis on a carbon fiber epoxy-based composite material surface, said at least one surface analysis comprising at least one of: gloss analysis, Fourier transform infrared spectroscopy, color analysis, contact angle analysis, surface resistivity, optical interferometry, and optically stimulated electron emission;

obtaining an actual carbon fiber epoxy-based composite material surface value from the at least one surface analysis performed on the carbon fiber epoxy-based composite material surface;

accessing a carbon fiber epoxy-based composite material surface treatment standard value; and comparing in real time the actual carbon fiber epoxy-based composite material surface value to the carbon fiber epoxy-based composite material surface treatment standard value; and determining the adequacy of a treatment level of the carbon fiber epoxy-based composite material surface based upon comparing the obtained actual carbon fiber epoxy-based composite material surface value to the carbon fiber epoxy-based composite material surface treatment standard value.

5. The method of claim 4, further comprising:

quantifying an amount of material removal from the carbon fiber epoxy-based composite material surface.

6. The method of claim 4, further comprising:

predicting an adhesion characteristic of the carbon fiber epoxy-based composite material surface.

7. A system for determining the level of treatment of a carbon fiber epoxy-based composite material surface, the system comprising:

a laser configured to remove an amount of material from a carbon fiber epoxy-based composite material surface;

at least one surface analyzer configured to perform at least one surface analysis comprising at least one of: gloss analysis, Fourier transform infrared spectroscopy analysis, color analysis, contact angle analysis, surface resistivity analysis, optical interferometry analysis, and optically stimulated electron emission analysis;

a processor in communication with the surface analyzer;

a memory, said memory comprising a memory value corresponding to an laser-treated carbon fiber epoxy-based composite material surface treatment standard value, said memory configured to be accessed by the processor;

software in communication with the processor, said software configured to compare the laser-treated carbon fiber epoxy-based composite material surface treatment standard value to the signal corresponding to the at least one surface analysis of the carbon fiber epoxy-based composite material surface; and wherein the system is configured to determine the level of treatment of the carbon-fiber epoxy-based composite material surface.

8. The system of claim 7, wherein the at least one surface analyzer is configured to generate a signal corresponding to at least one surface analysis of the carbon fiber epoxy-based composite material surface, said surface analysis comprising at least one of: gloss analysis, Fourier transform infrared spectroscopy analysis, color analysis, contact angle analysis, surface resistivity analysis, optical interferometry analysis, and optically stimulated electron emission analysis.

9. The system of claim 7, further comprising a display for reading an output value generated by the processor.

10. A system for inspecting a laser-treated carbon fiber epoxy-based composite material surface, the system comprising:

at least one surface analyzer, said at least one surface analyzer configured to perform a surface analysis comprising at least one of: gloss analysis, Fourier transform infrared spectroscopy analysis, color analysis, contact angle analysis, surface resistivity analysis, optical interferometry analysis, and optically stimulated electron emission analysis;

a processor in communication with the surface analyzer;

a memory, said memory comprising a memory value corresponding to an ideal laser-treated carbon fiber epoxy-based composite material surface characteristic value, said memory configured to be accessed by the processor; and software in communication with the processor, said software configured to compare the ideal laser-treated carbon fiber epoxy-based composite material surface characteristic value to the signal corresponding to the at least one surface analysis of the carbon fiber epoxy-based composite material surface.

11. The system of claim 10, wherein the at least one surface analyzer is configured to generate a signal corresponding to at least one surface analysis of the carbon fiber epoxy-based composite material surface, said surface analysis selected from the group consisting of: gloss analysis, Fourier transform infrared spectroscopy analysis, color analysis, contact angle analysis, surface resistivity analysis, optical interferometry analysis, and optically stimulated electron emission analysis.

12. The system of claim 10, further comprising a display for reading an output value generated by the processor.

13. The method of claim 1, further comprising:
integrating a laser treatment system; and
controlling the laser treatment system in real time based upon comparing the obtained actual carbon fiber epoxy-based composite material surface value to the carbon fiber epoxy-based composite material surface treatment standard value in real time.

14. The method of claim 1, wherein in the step of determining the adequacy of a treatment level of the carbon fiber epoxy-based composite material surface based upon comparing the obtained actual carbon fiber epoxy-based composite material surface value to the carbon fiber epoxy-based composite material surface treatment standard value is determined during a manufacturing process.

15. The method of claim 1, wherein in the step of determining the adequacy of a treatment level of the carbon fiber epoxy-based composite material surface based upon comparing the obtained actual carbon fiber epoxy-based composite material surface value to the carbon fiber epoxy-based composite material surface treatment standard value is determined during a post-manufacture inspection process.

16. The method of claim 4, further comprising:
determining the adequacy of a treatment level of the carbon fiber epoxy-based composite material surface based upon comparing the obtained actual carbon fiber epoxy-based composite material surface value to the carbon fiber epoxy-based composite material surface treatment standard value in real time.

17. The method of claim 4, wherein in the step of determining the adequacy of a treatment level of the carbon fiber epoxy-based composite material surface based upon comparing the obtained actual carbon fiber epoxy-based composite material surface value to the carbon fiber epoxy-based composite material surface treatment standard value is determined during at least one of a manufacturing process and a post-manufacture inspection process.

18. The system of claim 7, wherein the system is configured to determine the level of treatment of the carbon-fiber epoxy-based composite material surface based upon comparing the obtained actual carbon fiber epoxy-based composite material surface value to the carbon fiber epoxy-based composite material surface treatment standard value.

19. The system of claim 7, wherein the system is configured to determine the level of treatment of the carbon-fiber epoxy-based composite material surface based upon comparing the obtained actual carbon fiber epoxy-based composite material surface value to the carbon fiber epoxy-based composite material surface treatment standard value in real time.

20. The system of claim 10, wherein the system is configured to determine the level of treatment of the carbon-fiber epoxy-based composite material surface based upon comparing the obtained actual carbon fiber epoxy-based composite material surface value to the carbon fiber epoxy-based composite material surface treatment standard value during at least one of a manufacturing process and a post-manufacture inspection process.

* * * * *